United States Patent
Yuasa et al.

(10) Patent No.: US 11,685,395 B2
(45) Date of Patent: Jun. 27, 2023

(54) AUTONOMOUS DRIVING ASSISTANCE DEVICE, AUTONOMOUS DRIVING ASSISTANCE SYSTEM, AND AUTONOMOUS DRIVING ASSISTANCE METHOD

(71) Applicant: Mitsubishi Electric Corporation, Tokyo (JP)

(72) Inventors: Misato Yuasa, Tokyo (JP); Shinsaku Fukutaka, Tokyo (JP); Munetaka Nishihira, Tokyo (JP); Akiko Imaishi, Tokyo (JP); Tsuyoshi Sempuku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/529,325

(22) Filed: Nov. 18, 2021

(65) Prior Publication Data
US 2022/0073092 A1 Mar. 10, 2022

Related U.S. Application Data

(63) Continuation of application No. PCT/JP2019/024252, filed on Jun. 19, 2019.

(51) Int. Cl.
*B60W 50/16* (2020.01)
*B60W 60/00* (2020.01)
(Continued)

(52) U.S. Cl.
CPC .......... *B60W 50/16* (2013.01); *B60W 30/143* (2013.01); *B60W 40/08* (2013.01);
(Continued)

(58) Field of Classification Search
CPC .... B60W 50/16; B60W 30/143; B60W 40/08; B60W 60/0016; B60W 2040/0827; B60W 2050/143; B60W 2050/146; G06V 20/597
See application file for complete search history.

(56) References Cited

U.S. PATENT DOCUMENTS 10,252,726 B2 * 4/2019 Emura ................ B60W 50/085
10,956,759 B1 * 3/2021 Pertsel .............. B60R 21/01552
(Continued)

FOREIGN PATENT DOCUMENTS

CN 108430818 A 8/2018
JP 2014-13496 A 1/2014
(Continued)

OTHER PUBLICATIONS

International Search Report and Written Opinion dated Aug. 6, 2019, received for PCT Application PCT/JP2019/024252, Filed on Jun. 19, 2019, 9 pages including English Translation.
(Continued)

*Primary Examiner* — Mohamed Barakat
(74) *Attorney, Agent, or Firm* — Xsensus LLP

(57) ABSTRACT

An autonomous driving assistance device includes: a determination unit for determining whether or not a driver of a vehicle needs a rest on the basis of detection information of a state of the driver; and a control unit for causing an output device of the vehicle to output a pattern that prompts the driver to sleep through at least one of sight, hearing, or touch during a period in which the vehicle has started moving to a parking area and is parked at the parking area in a case where the determination unit has determined that the driver needs a rest.

15 Claims, 9 Drawing Sheets

(51) Int. Cl.
  *G06V 20/59* (2022.01)
  *B60W 30/14* (2006.01)
  *B60W 40/08* (2012.01)
  *B60W 50/14* (2020.01)

(52) U.S. Cl.
  CPC ....... *B60W 60/0016* (2020.02); *G06V 20/597* (2022.01); *B60W 2040/0827* (2013.01); *B60W 2050/143* (2013.01); *B60W 2050/146* (2013.01)

(56) References Cited

U.S. PATENT DOCUMENTS

| | | | |
|---|---|---|---|
| 11,188,074 B1* | 11/2021 | Benavidez | G05D 1/0022 |
| 2016/0104486 A1* | 4/2016 | Penilla | G10L 15/02 |
| | | | 704/232 |
| 2017/0305349 A1* | 10/2017 | Naboulsi | B60R 1/025 |
| 2019/0056732 A1 | 2/2019 | Aoi et al. | |
| 2020/0079398 A1* | 3/2020 | Matsumoto | B60W 50/10 |

FOREIGN PATENT DOCUMENTS

| | | |
|---|---|---|
| JP | 2017-97518 A | 6/2017 |
| JP | 2019-508771 A | 3/2019 |
| WO | 2017/102614 A1 | 6/2017 |

OTHER PUBLICATIONS

Chinese Office Action dated Feb. 14, 2023 in corresponding Chinese Patent Application No. 201980097380.6 (with machine-generated English translation), 13 pages.

\* cited by examiner

AUTONOMOUS DRIVING ASSISTANCE DEVICE, AUTONOMOUS DRIVING ASSISTANCE SYSTEM, AND AUTONOMOUS DRIVING ASSISTANCE METHOD

CROSS-REFERENCE TO RELATED APPLICATION

The present application is a continuation of International Patent Application PCT/JP2019/024252, filed Jun. 19, 2019, the entire contents of which are incorporated herein by reference.

TECHNICAL FIELD

The present invention relates to an autonomous driving assistance device, an autonomous driving assistance system, and an autonomous driving assistance method for supporting driving of a vehicle.

BACKGROUND ART

In a vehicle having an autonomous driving function, it is necessary to smoothly switch from autonomous driving to manual driving (transfer of driving authority from the vehicle to a driver). However, if the driver is drowsy or fatigued, there is a possibility that the driver cannot immediately handle manual driving. In response to this problem, for example, a device described in Patent Literature 1 warns a driver to take a rest only when the driver is determined to be drowsy and fatigued and the vehicle is within a certain distance from a rest area (parking areas, side strips, and the like). When the driver takes a rest in response to this warning, it is possible to allow the driver to recover to be able to handle manual driving.

CITATION LIST

Patent Literature

Patent Literature 1: JP 2014-13496 A

SUMMARY OF INVENTION

Technical Problem

In the device described in Patent Literature 1, a warning to prompt the driver to take a rest is issued, and the vehicle is caused to be parked in a rest area. However, the in-vehicle environment is originally designed to allow the driver to concentrate on driving, and it is not intended that the driver proactively take a nap. Therefore, there is a disadvantage that, even when the vehicle is parked, it takes time for the driver to fall asleep.

The present invention solves the above problems, and an object of the present invention is to provide an autonomous driving assistance device, an autonomous driving assistance system, and an autonomous driving assistance method capable of providing an in-vehicle environment that prompts a driver to sleep.

Solution to Problem

An autonomous driving assistance device according to the present invention includes: processing circuitry configured to determine whether or not a driver of a vehicle needs a rest on the basis of detection information of a state of the driver; cause an output device of the vehicle to output a pattern that prompts the driver to sleep through at least one of sight, hearing, or touch during a period in which the vehicle has started moving to a parking area and is parked at the parking area in a case where it has been determined that the driver needs a rest, and inquire of the driver whether or not to take a rest when it is determined that the driver needs a rest, wherein the processing circuitry starts moving the vehicle to the parking area when a response of taking a rest from the driver is received, and the processing circuitry causes the output device to output a pattern that prompts the driver to stay awake through at least one of sight, hearing, or touch when a response of not taking a rest from the driver is received.

Advantageous Effects of Invention

According to the present invention, it is possible to output a pattern that prompts a driver to sleep from an output device of a vehicle through at least one of sight, hearing, or touch, it is possible to provide an in-vehicle environment that prompts the driver to sleep.

DESCRIPTION OF EMBODIMENTS

First Embodiment

Figure 1:
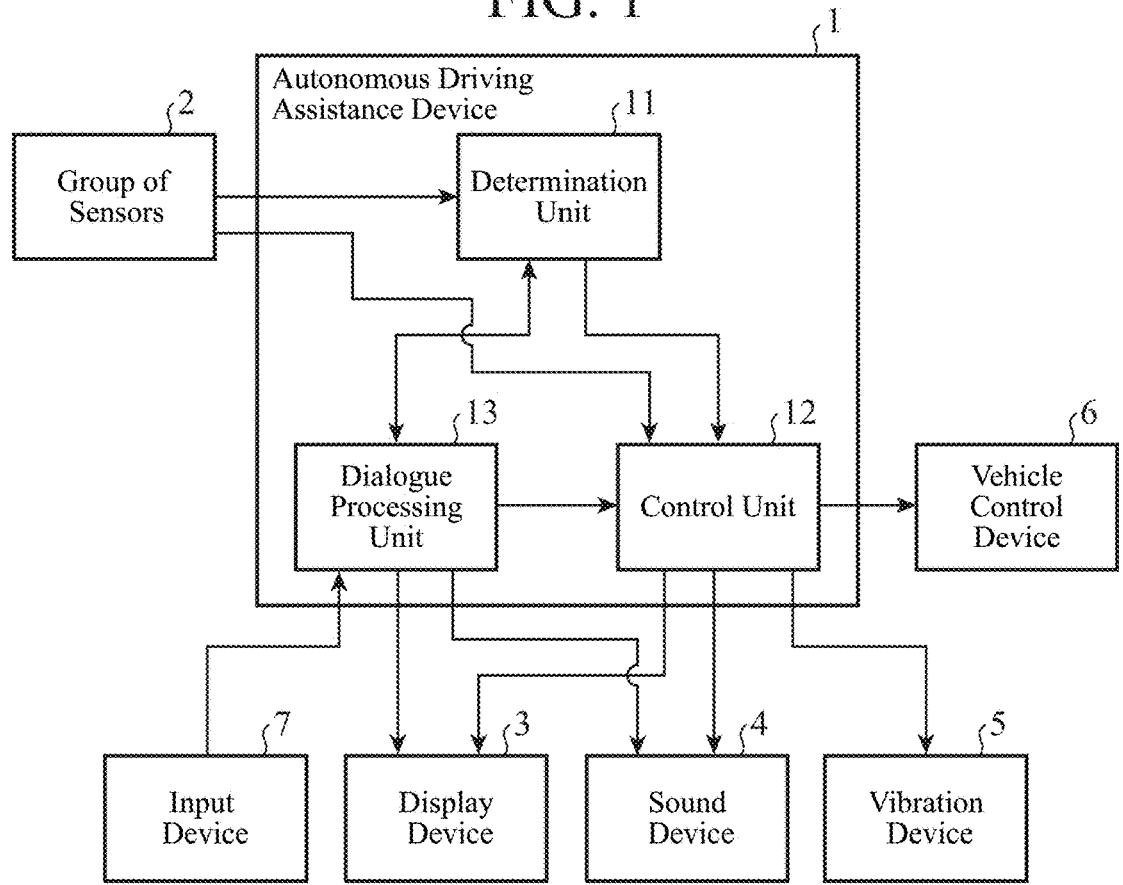
FIG. 1 is a block diagram illustrating a configuration of an autonomous driving assistance device according to a first embodiment.

FIG. 1 is a block diagram illustrating a configuration of an autonomous driving assistance device 1 according to a first embodiment. The autonomous driving assistance device 1 is provided, for example, in a vehicle having an autonomous driving function, and assists autonomous driving of the vehicle. In addition to the autonomous driving assistance device 1, a group of sensors 2, a display device 3, a sound device 4, a vibration device 5, a vehicle control device 6, and an input device 7 are mounted on the vehicle as illustrated in FIG. 1. The display device 3, the sound device 4, and the vibration device 5 are output devices included in the vehicle.

The autonomous driving assistance device 1 causes an output device of the vehicle to output a pattern that prompts a driver to sleep through at least one of sight, hearing, or touch during a period in which the vehicle has started moving to a parking area and is parked at the parking area in a case where it has been determined that the driver needs a rest. The pattern that prompts the driver to sleep is, for example, a pattern of at least one of light, sound, or vibration.

The group of sensors 2 includes a plurality of sensors mounted on the vehicle and detects a state inside and outside the vehicle. The group of sensors 2 includes, for example, a vehicle speed sensor, a steering angle sensor, an in-vehicle camera, an acceleration sensor, an angular velocity sensor, a GPS device, a navigation system, exterior cameras, an exterior sensor, and an illuminance sensor. Detection information detected by the group of sensors 2 is output to the autonomous driving assistance device 1. The speed sensor detects the speed of the vehicle and outputs an electric signal (vehicle speed pulse) corresponding to the wheel speed. The steering angle sensor detects the steering angle of the vehicle and outputs an electric signal corresponding to the steering angle.

The in-vehicle camera is provided facing a seat in the cabin and outputs image information obtained by photographing the face or upper body of a passenger seated at the seat. The in-vehicle camera may be a driver camera that photographs the driver. The acceleration sensor detects the acceleration of the vehicle and is, for example, a three-axis acceleration sensor. The angular velocity sensor detects the angular velocity of the vehicle. The angular velocity is information for calculating the turning speed of the vehicle.

The GPS device receives radio waves transmitted from GPS satellites in the global positioning system and detects the position of the vehicle on the basis of signals of the radio waves that have been received. The navigation system searches for a recommended route for guiding the vehicle to a destination on the basis of the position information of the vehicle detected by the GPS device and map information. The navigation system also has a communication function and communicates with a server to acquire external information such as congestion information or road closure information from the server.

The external cameras photograph the surroundings of the vehicle. The exterior cameras are provided, for example, on the front, rear, left, and right sides of the vehicle and output each captured image to the autonomous driving assistance device 1. The exterior sensor detects an object around the vehicle and includes, for example, an ultrasonic sensor, a radar sensor, a millimeter wave radar sensor, or an infrared laser sensor. The position of an object outside the vehicle and the distance to the object are detected on the basis of detection information of the object outside the vehicle detected by the external sensor. The illuminance sensor detects the illuminance around the vehicle.

The display device 3 is an output device that displays a pattern that prompts the driver to sleep through vision and is, for example, a plurality of display devices provided in the cabin. The display device 3 displays a light pattern in which a display mode of a single or a plurality of light elements changes over time as a pattern that prompts the driver to sleep. In the light pattern, shapes, sizes, positions, the luminance, and colors of light elements that are displayed, a time period during which the light element is displayed, and timing at which the light element changes are set so that the driver is introduced into sleep.

The sound device 4 is an output device that outputs a pattern that prompts a driver to sleep through hearing and is, for example, a combination of a plurality of speakers provided in the cabin and a plurality of amplifiers that control the volume of the speakers. The sound device 4 outputs a sound pattern in which an output mode of a sound element changes with time as a pattern that prompts the driver to sleep. The sound pattern is set with the tone, the interval, the tempo, the volume, a time period during which a sound element is output, and timing when the sound element changes so that the driver is introduced into sleep.

The vibration device 5 is an output device that outputs a pattern that prompts the driver to sleep through touch and is, for example, a combination of a plurality of vibration speakers provided on a seat at which the driver is seated or a steering wheel operated by the driver and a plurality of amplifiers that control the magnitude of the vibration thereof. The vibration device 5 outputs a vibration pattern, in which an output mode of a vibration element changes, as a pattern that prompts the driver to sleep. In the vibration pattern, a frequency structure, the tempo, the magnitude of vibration, a time period during which a vibration element is output, and timing at which the vibration element changes are set.

The vehicle control device 6 is a device that performs various types of control for implementing autonomous driving of the vehicle and is, for example, an electronic control unit (ECU) mounted on the vehicle. Examples of the various types of control include lane keeping control, navigation control, and stop control. The vehicle control device 6 also predicts a point at which autonomous driving is switched to manual driving and sets the predicted point as a scheduled switching point. The vehicle control device 6 notifies the autonomous driving assistance device 1 of schedule information indicating that it is scheduled to switch from autonomous driving to manual driving a certain period of time before the vehicle actually reaches the scheduled switching point.

The input device 7 is a device that receives information input from a driver. For example, the input device 7 may be a touch panel provided on a display screen of the display device 3 or a hard switch provided to a steering wheel or a center console or may receive information input by voice recognition using a microphone. The input device 7 is used for the dialogue process between the driver and the autonomous driving assistance device 1.

The autonomous driving assistance device 1 includes a determination unit 11, a control unit 12, and a dialogue processing unit 13. The determination unit 11 determines whether or not a driver needs a rest on the basis of detection information of the state of the driver of the vehicle. For example, the determination unit 11 performs image analysis on image information of the driver captured by the in-vehicle camera included in the group of sensors 2 and calculates the rest necessity level of the driver on the basis of the image analysis result. For the image analysis, analysis methods such as pattern matching can be used. The determination unit 11 determines that the driver needs a rest when the rest necessity level is higher than or equal to a threshold value and determines that the driver does not need a rest when the rest necessity level is less than the threshold value.

The control unit 12 causes an output device of the vehicle to output a pattern that prompts a driver to sleep during a period in which the vehicle has started moving to a parking area and is parked at the parking area in a case where the determination unit 11 has determined that the driver needs a rest. For example, the control unit 12 causes at least one of the display device 3, the sound device 4, or the vibration device 5 to output a pattern that prompts the driver to sleep.

When the determination unit 11 determines that the driver needs a rest, the dialogue processing unit 13 inquires of the driver whether or not to take a rest. For example, the dialogue processing unit 13 causes the display device 3 to display the inquiry information or causes the sound device 4 to output the inquiry information by voice. When the dialogue processing unit 13 receives a response from the driver that the driver takes a rest, the control unit 12 causes the output device to output a pattern that prompts the driver to sleep.

Note that, in a case of not inquiring the driver whether or not to take a rest, when the determination unit 11 determines that the driver needs a rest, the control unit 12 immediately outputs a pattern that prompts the driver to sleep from the output device. In this case, the autonomous driving assistance device 1 may not include the dialogue processing unit 13.

Figure 2:
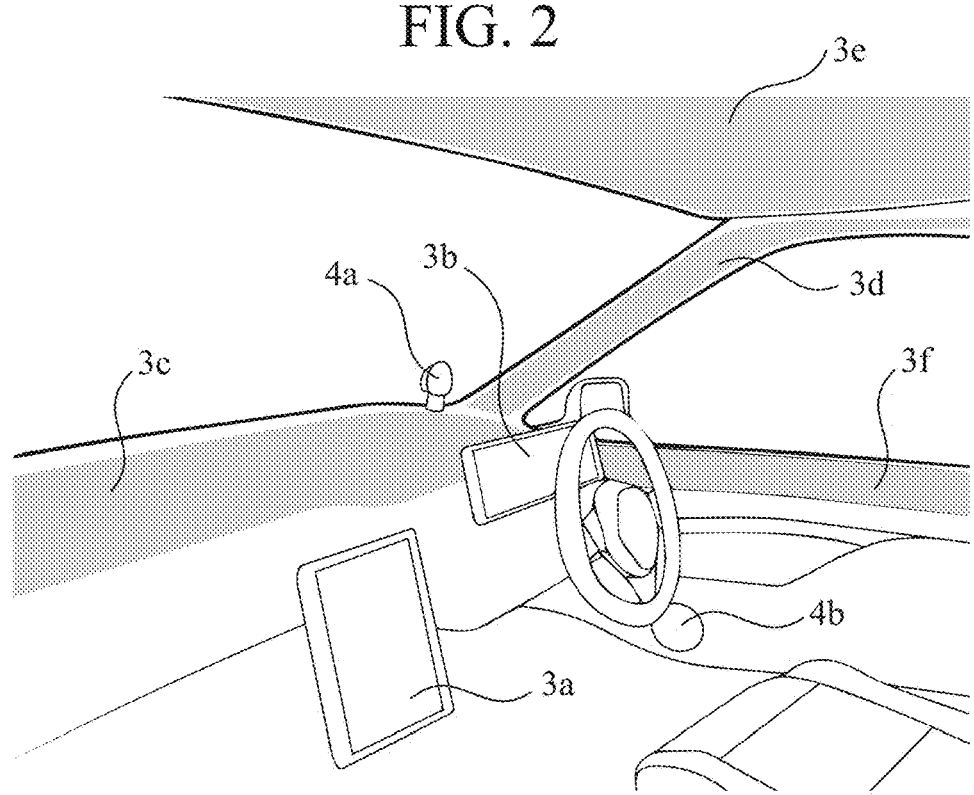
FIG. 2 is a diagram illustrating a display device and a sound device in the first embodiment.

FIG. 2 is a diagram illustrating the display devices 3 and the sound devices 4 in the first embodiment. The display device 3 illustrated in FIG. 1 includes, for example, a center information display (CID) 3a, an instrument cluster display (ICD) 3b, a dashboard display 3c, a pillar display 3d, a ceiling display 3e, and a door display 3f illustrated in FIG. 2.

The CID 3a and the ICD 3b are displays installed on the dashboard in the cabin and include a microphone, a speaker, and a touch panel. The CID 3a and the ICD 3b display a pattern that prompts the driver to sleep and receive input of information using the microphones, the speakers, or the touch panels. The dashboard display 3c is a display having a display screen on a part of the dashboard and is, for example, a combination meter. The pillar display 3d is a display having a display screen on a pillar. The ceiling display 3e is a display having a display screen on the ceiling in the cabin.

For example, the control unit 12 may synchronize the display by the CID 3a, the ICD 3b, the dashboard display 3c, the pillar display 3d, the ceiling display 3e, and the door display 3f and cause these displays to repeatedly display the same pattern as a pattern that prompts the driver to sleep. Alternatively, after a pattern is displayed with any of these displays as a starting point, the pattern may be displayed so that the pattern appears to flow in order from a display close to the above display to a display far from the above display.

As illustrated in FIG. 2, since the display device 3 includes a plurality of displays arranged at various positions in the cabin, the display is within the field of view of the driver even when the face orientation or the posture of the driver changes. As a result, overlooking of a light pattern is prevented.

The sound device 4 illustrated in FIG. 1 includes, for example, a tweeter speaker 4a and a woofer speaker 4b illustrated in FIG. 2. The tweeter speaker 4a is an in-vehicle speaker that outputs high-range sound. The woofer speaker 4b is an in-vehicle speaker that outputs low-range sound. The control unit 12 causes, for example, the tweeter speaker 4a to output a pattern and causes the woofer speaker 4b to output a pattern as the pattern that prompts the driver to sleep.

As illustrated in FIG. 2, since the sound device 4 includes a plurality of speakers arranged at various positions in the cabin, directivity can be imparted to a sound pattern output in the cabin, and a surround effect can also be achieved. In addition, since a speaker can be selected depending on the face direction of the driver from the plurality of speakers, a sound pattern can be output from a speaker located at a position where the driver can easily hear.

Figure 3:
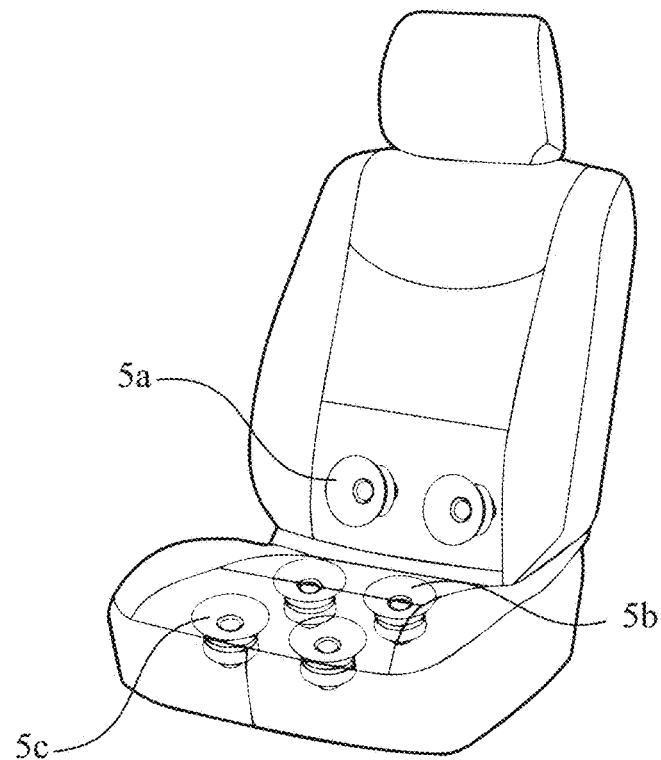
FIG. 3 is a diagram illustrating a vibration device in the first embodiment.

FIG. 3 is a diagram illustrating the vibration device 5 in the first embodiment. The vibration device 5 illustrated in FIG. 1 includes, for example, vibration speakers 5a to 5c illustrated in FIG. 3. The vibration speakers 5a to 5c are provided in a seat in the cabin. The vibration output from the vibration speakers 5a is transmitted to the waist of a passenger seated at the seat, the vibration output from the vibration speakers 5b is transmitted to the buttocks of the passenger seated at the seat, and the vibration output from the vibration speakers 5c is transmitted to the thighs of the passenger seated at the seat.

As illustrated in FIG. 3, the vibration device 5 includes a plurality of vibration speakers arranged at various locations in a seat. As a result, the control unit 12 can select, from among the plurality of vibration speakers, a vibration speaker provided at a location where vibration is easily transmitted to the passenger depending on how the passenger is seated at the seat, the reclined state of the seat, or how the driver feels the vibration due to the passenger's physique. As a result, it is possible to accurately transmit the vibration to the passenger.

The control unit 12 may cause the vibration speakers 5a, 5b, and 5c to output of vibration in synchronization and to repeatedly output the same pattern as a pattern that prompts the driver to sleep. Alternatively, a vibration pattern may be output from any one of these vibration speakers as a starting point, and then the vibration pattern may be output in order of proximity to the vibration speaker as the starting point.

Next, the operation of the autonomous driving assistance device 1 will be described.

Figure 4:
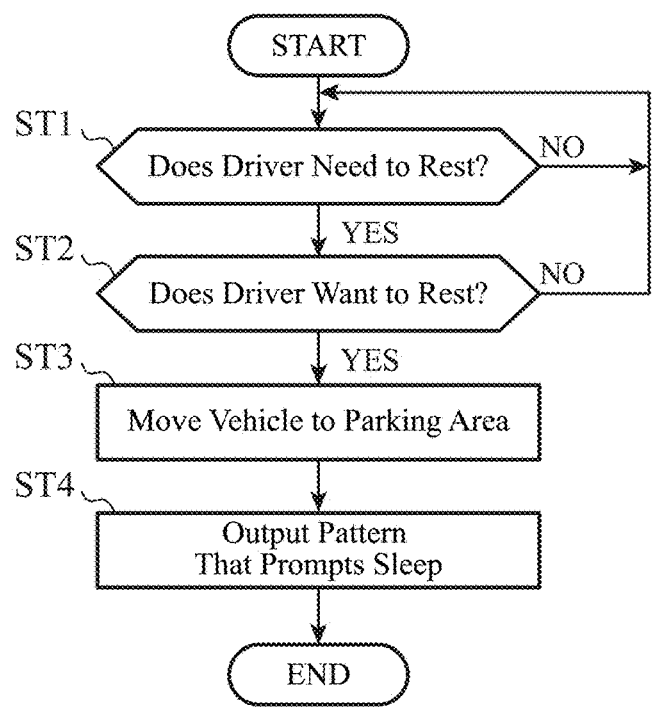
FIG. 4 is a flowchart illustrating an autonomous driving assistance method according to the first embodiment.

FIG. 4 is a flowchart illustrating an autonomous driving assistance method according to the first embodiment and illustrating the operation of the autonomous driving assistance device 1 illustrated in FIG. 1.

First, the determination unit 11 determines whether or not the driver of the vehicle need a rest (step ST1). For example, the determination unit 11 performs image analysis on image information of the driver captured by the in-vehicle camera included in the group of sensors 2 and calculates the rest necessity level of the driver on the basis of the image analysis result. The rest necessity level is, for example, an eye opening degree of the driver. The eye opening degree is a ratio between the iris and the white of the driver's eye and is based on a ratio when the driver is awakened and performing normal driving. The lower the eye opening degree is, the lower the awakening level of the driver is, and the higher the rest necessity level is. The higher the eye opening degree is, the higher the awakening level of the driver is, and the lower the rest necessity level is.

Figure 5:
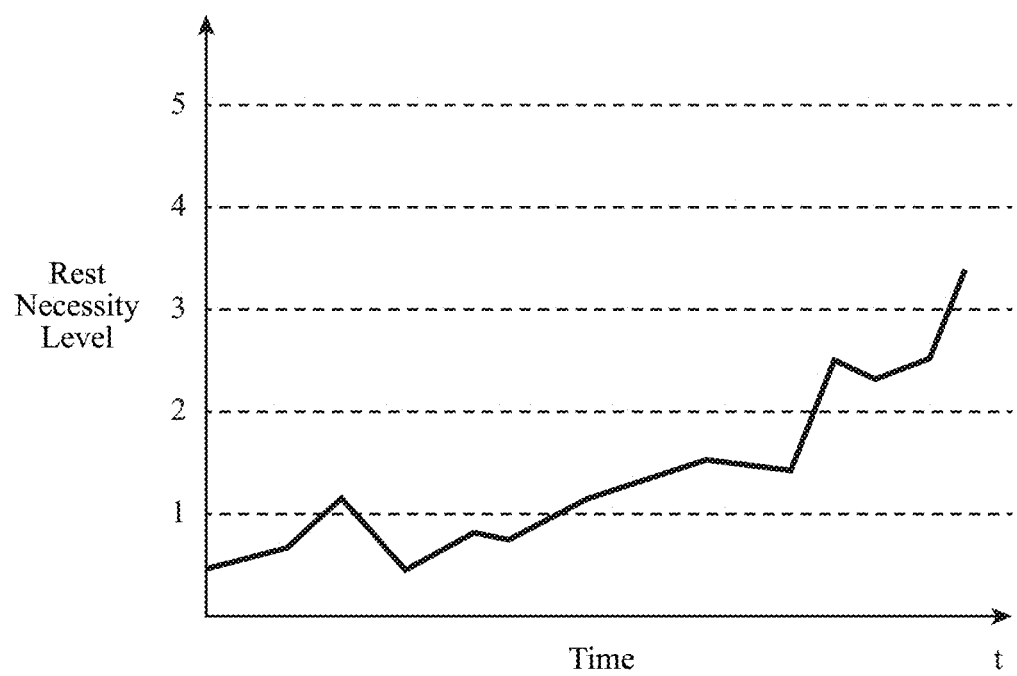
FIG. 5 is a graph illustrating the temporal change in the rest necessity level of a driver.

FIG. 5 is a graph illustrating the temporal change in the rest necessity level of a driver. As illustrated in FIG. 5, the driver becomes fatigued by continuing driving the vehicle, and the rest necessity level rises accordingly. After calculating the rest necessity level of the driver, the determination unit 11 determines that the driver needs a rest when a period in which the rest necessity level is higher than or equal to a threshold value lasts longer than or equal to a certain period of time. In addition, the determination unit 11 determines that the driver does not need a rest in a case where the rest necessity level is less than the threshold value or in a case where a period in which the rest necessity level is higher than or equal to the threshold value is less than a certain period of time.

In the graph illustrated in FIG. 5, five levels are set as the rest necessity levels. For example, the determination unit 11 determines that the driver needs a rest when a rest necessity level higher than or equal to the third level of the rest necessity level lasts for a certain period of time. Meanwhile, in a case where the rest necessity level is less than the third level or a period in which the rest necessity level is higher than or equal to the third level is less than a certain period of time, it is determined that driver does not need a rest. The determination result as to whether or not the driver needs a rest is output from the determination unit 11 to the control unit 12 and the dialogue processing unit 13. If the determination unit 11 determines that the driver does not need a rest (step ST1; NO), the flow returns to step ST1, and the determination process as to whether or not the driver needs a rest is repeated.

If the determination unit 11 determines that the driver needs a rest (step ST1; YES), the dialogue processing unit 13 inquires whether or not the driver wants a rest (step ST2). The dialogue processing unit 13 uses at least one of the display device 3 or the sound device 4 to inquire whether or not the driver wants a rest. For example, the dialogue processing unit 13 causes the tweeter speaker 4a and the woofer speaker 4b to output voice such as "Do you want to take a rest?" and receives a response using the input device 7. In addition, the dialogue processing unit 13 displays information indicating whether or not the driver wants a rest on at least one of the CID 3a, the ICD 3b, or the dashboard display 3c and receives a response using the input device 7.

If a response "I don't take a rest" is received from the driver (step ST2; NO), the dialogue processing unit 13 notifies the determination unit 11 and the control unit 12 of this response information. If the driver does not take a rest, the determination unit 11 returns to step ST1 and repeats the determination, and the control unit 12 does not shift to the pattern output process.

If the dialogue processing unit 13 receives a response "I take a rest" from the driver (step ST2; YES), this response information is output to the control unit 12. If the driver takes a rest, the control unit 12 instructs the vehicle control device 6 to move the vehicle to a parking area (step ST3). For example, the control unit 12 determines a parking area (for example, a parking lot, a side strip, or the like) where the vehicle can reach from the current location and the driver can rest using map information acquired by the navigation system and the position information of the vehicle acquired by the GPS device, instructs the vehicle control device 6 to move the vehicle to the parking area by autonomous driving, and causes the vehicle to park when the vehicle arrives at the parking area.

In a case where the route of the vehicle is determined by the navigation system, areas where the vehicle can park on this route may be determined as parking areas. In addition, the control unit 12 can perform image analysis on image information of images ahead of the vehicle captured by the external camera, determine the width of a side strip ahead of the vehicle and the presence or absence of other vehicles on the basis of the image analysis result, and determine a parking area. Furthermore, the control unit 12 may perform wireless communication with a preceding vehicle traveling ahead to inquire whether or not there is an area where the vehicle can park and determine an area specified by the response from the preceding vehicle by the wireless communication as a parking area. The control unit 12 may further reserve the parking area before the vehicle arrives at the parking area.

When it is started to move the vehicle to the parking area, the control unit 12 causes at least one of the display device 3, the sound device 4, or the vibration device 5 to output a pattern that prompts the driver to sleep (step ST4). For example, the control unit 12 causes at least one of the display device 3, the sound device 4, or the vibration device 5 to output a pattern that prompts the driver to sleep on the basis of information indicating the situation inside and outside the vehicle detected by the group of sensors 2.

The pattern that prompts the driver to sleep is, for example, a pattern in which at least one of a light element, a sound element, or a vibration element is output in synchronization with timing at which the vehicle sequentially passes in front of three-dimensional objects that are cyclically located on the roadside of the traveling road. Examples of the three-dimensional objects include a utility pole, a sign, a guardrail, a guard fence, and a street tree. With this pattern, a stimulus is given to at least one of sight, hearing, or touch of the driver in a monotonous repetition synchronized with the cycle in which three-dimensional objects are located on the roadside, and thus the driver is prompted to sleep.

For example, the control unit 12 performs image analysis on image information of images ahead of the vehicle captured by the external camera and determines three-dimensional objects cyclically located on the roadside on the basis of the image analysis result. The control unit 12 determines timing at which the vehicle sequentially passes by cyclic three-dimensional objects on the basis of the speed of the vehicle detected by the vehicle speed sensor and causes an output device to output a pattern of at least one of light, sound, or vibration so as to be synchronized with the timing.

In addition, the control unit 12 detects vibration generated in the vehicle itself on the basis of the acceleration of the vehicle detected by the acceleration sensor included in the group of sensors 2. Then, the control unit 12 controls the output of vibration by the vibration device 5 on the basis of vibration generated in the vehicle itself and thereby corrects a shift between the timing (vibration pattern) at which the vehicle sequentially passes in front of the three-dimensional objects cyclically located on the roadside and the vibration transmitted to the driver in the cabin. As a result, a monotonous vibration pattern synchronized with the timing at which the vehicle sequentially passes in front of the three-dimensional objects cyclically located on the roadside is transmitted to the driver, thereby sleep is promoted.

The control unit 12 determines the brightness inside the cabin of the vehicle on the basis of the illuminance information around the vehicle detected by the illuminance sensor and controls the output of light by the display device 3 and thereby outputs a light pattern with luminance corresponding to the brightness inside the cabin. For example, the luminance of the light pattern is increased when the inside of the cabin is bright as in a sunny day, and the luminance of the light pattern is reduced when the inside of the cabin is dark as at night. As a result, the shift between the light pattern output from the display device 3 and the brightness around the vehicle is reduced, thereby the driver is prompted to sleep.

Based on at least one of the steering angle of the vehicle detected by the steering angle sensor or the angular velocity of the vehicle detected by the angular velocity sensor, the control unit 12 suppresses the timing at which the vehicle sequentially passes by three-dimensional objects cyclically located on the roadside from deviating as the vehicle turns right or left. For example, when the vehicle is decelerated as the vehicle turns right or left, this speed change causes a shift in the timing at which the vehicle sequentially passes in front of three-dimensional objects cyclically located on the roadside. The control unit 12 estimates a change in the speed of the vehicle on the basis of the steering angle or the angular velocity of the vehicle and corrects a shift in the timing corresponding to the change in the speed of the vehicle. As a result, even when the vehicle turns right or left, a monotonous pattern synchronized with the timing at which the vehicle sequentially passes in front of the three-dimensional objects cyclically located on the roadside is transmitted from the output device to the driver, thereby promoting sleep.

The pattern that prompts the driver to sleep may be, for example, a pattern synchronized with timing at which the vehicle sequentially passes in front of a building having a preset appearance among a plurality of buildings located on the roadside. For example, the control unit 12 distinguishes the appearance of a plurality of buildings located on the roadside on the basis of route information acquired from the navigation system and position information of the vehicle acquired from the GPS device. The control unit 12 causes the output device to output a pattern synchronized with the timing at which the vehicle sequentially passes in front of a building having the appearance matching a preset appearance among a plurality of buildings whose appearances have been distinguished as a pattern that prompts the driver to sleep.

Furthermore, the control unit 12 can output a sound pattern corresponding to the scenery outside the vehicle by controlling the sound device 4. For example, in a case where the vehicle is traveling along the coast, the control unit 12 outputs a sound pattern using the sound of waves, thereby stimulating the hearing of the driver with monotonous repetition matching the scenery outside the vehicle and prompting the driver to sleep.

The control unit 12 can change the pattern that prompts the driver to sleep in accordance with the situation ahead of the vehicle acquired by wireless communication from the preceding vehicle traveling ahead of the vehicle. For example, in a case where there is an intersection ahead of the vehicle and the vehicle turns left at the intersection, the control unit 12 estimates the deceleration of the vehicle by arrival at the intersection and changes the output pattern so as to match the change in the vehicle speed. As a result, the driver is stimulated by monotonous repetition consistent with the real-time change in the situation outside the vehicle, thereby promoting sleep.

Furthermore, the control unit 12 can perform image analysis on image information of the driver captured by the in-vehicle camera, determine the face orientation, the posture, or the physique of the driver on the basis of the image analysis result, and control the display device 3, the sound device 4, or the vibration device 5 depending on the face orientation, the posture, or the physique of the driver. For example, the control unit 12 determines a display that is within the field of view of the driver from among the CID 3a, the ICD 3b, the dashboard display 3c, the pillar display 3d, the ceiling display 3e, and the door display 3f on the basis of the face orientation of the driver and displays a light pattern on the display that has been determined. In addition, the control unit 12 determines a location of the seat with which the body of the driver is in contact or a location of the seat on which the body weight is applied on the basis of the posture or the physique of the driver and causes a vibration speaker at the determined location of the seat among the vibration speakers 5a to 5c to output a vibration pattern. As a result, it is possible to appropriately output a pattern that prompts the driver to sleep from an output device.

In addition, the control unit 12 can control the intensity of vibration output from the vibration device 5 on the basis of at least one of the steering angle of the vehicle detected by the steering angle sensor or the angular velocity of the vehicle detected by the angular velocity sensor. For example, even when the driver is seated facing the front, how the weight of the driver is applied to the seat changes depending on the travel of the vehicle, and thus, how the vibration output from the vibration speaker is transmitted to the driver also changes. When the vehicle turns right, the driver's weight is applied on the right side of the seat, and thus the vibration is output from the vibration speaker provided on the right side of the seat. As a result, the vibration device 5 can appropriately output a vibration pattern that prompts the driver to sleep.

Next, a hardware configuration for implementing the functions of the autonomous driving assistance device 1 will be described.

The functions of the determination unit 11, the control unit 12, and the dialogue processing unit 13 in the autonomous driving assistance device 1 are implemented by a processing circuit. That is, the autonomous driving assistance device 1 includes a processing circuit for executing the processes from step ST1 to step ST4 in FIG. 4. The processing circuit may be dedicated hardware or a central processing unit (CPU) for executing a program stored in a memory.

Figure 6A:
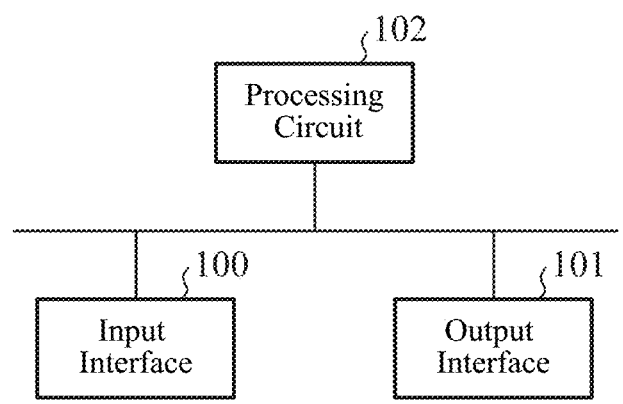
FIG. 6A is a block diagram illustrating a hardware configuration for implementing the functions of the autonomous driving assistance device according to the first embodiment.
Figure 6B:
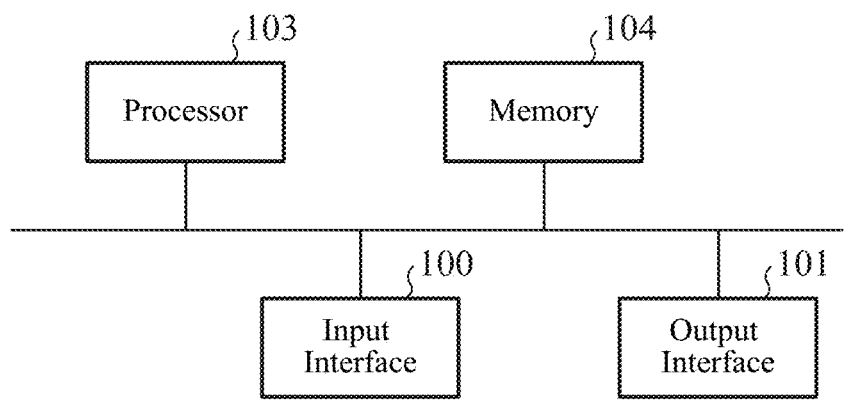
FIG. 6B is a block diagram illustrating a hardware configuration for executing software for implementing the functions of the autonomous driving assistance device according to the first embodiment.

FIG. 6A is a block diagram illustrating a hardware configuration for implementing the functions of the autonomous driving assistance device 1. FIG. 6B is a block diagram illustrating a hardware configuration for executing software for implementing the functions of the autonomous driving assistance device 1. In FIGS. 6A and 6B, an input interface 100 relays detection information input from the group of sensors 2 to the autonomous driving assistance device 1 and relays input information input from the input device 7 to the autonomous driving assistance device 1. Meanwhile, the output interface 101 relays a pattern that prompts the driver to sleep or inquiry information as to whether or not the driver takes a rest which is output from the autonomous driving assistance device 1 to the display device 3, the sound device 4, and the vibration device 5.

In a case where the processing circuit is a processing circuit 102 of dedicated hardware illustrated in FIG. 6A, the processing circuit 102 may be, for example, a single circuit, a composite circuit, a programmed processor, a parallel programmed processor, an application specific integrated circuit (ASIC), a field-programmable gate array (FPGA), or a combination thereof. The functions of the determination unit 11, the control unit 12, and the dialogue processing unit 13 in the autonomous driving assistance device 1 may be implemented by separate processing circuits, or these functions may be collectively implemented by a single processing circuit.

In the case where the processing circuit is a processor 103 illustrated in FIG. 6B, the functions of the determination unit 11, the control unit 12, and the dialogue processing unit 13 in the autonomous driving assistance device 1 are implemented by software, firmware, or a combination of software and firmware. The software or the firmware is described as a program and is stored in a memory 104.

The processor 103 reads and executes the program stored in the memory 104 to implement the functions of the determination unit 11, the control unit 12, and the dialogue processing unit 13 in the autonomous driving assistance device 1. For example, the autonomous driving assistance device 1 includes the memory 104 for storing a program that, when executed by the processor 103, results in execution of the processes of steps ST1 to ST4 in the flowchart illustrated in FIG. 4. These programs cause a computer to execute the procedures or methods performed by the determination unit 11, the control unit 12, and the dialogue processing unit 13. The memory 104 may be a computer-readable storage medium storing the programs for causing a computer to function as the determination unit 11, the control unit 12, and the dialogue processing unit 13.

The memory 104 corresponds to a nonvolatile or volatile semiconductor memory such as a random access memory (RAM), a read only memory (ROM), a flash memory, an erasable programmable read only memory (EPROM), or an electrically-EPROM (EEPROM), a magnetic disc, a flexible disc, an optical disc, a compact disc, a mini disc, a DVD, or the like.

A part of the functions of the determination unit 11, the control unit 12, and the dialogue processing unit 13 in the autonomous driving assistance device 1 may be implemented by dedicated hardware, and another part thereof may be implemented by software or firmware. For example, the functions of the determination unit 11 and the control unit 12 are implemented by the processing circuit 102 that is dedicated hardware, whereas the functions of the dialogue processing unit 13 are implemented by the processor 103 reading and executing programs stored in the memory 104. In this manner, the processing circuit can implement the functions by hardware, software, firmware, or a combination thereof.

As described above, in the autonomous driving assistance device 1 according to the first embodiment, a pattern that prompts the driver to sleep through at least one of sight, hearing, or touch is output from the display device 3, the sound device 4, or the vibration device 5 included in the vehicle. As a result, it is possible to provide an in-vehicle environment that prompts the driver to sleep. By allowing the driver to sleep promptly, the time required for recovery from fatigue is shortened.

The autonomous driving assistance device 1 according to the first embodiment further includes the dialogue processing unit 13 that inquires of a driver whether or not to take a rest when the determination unit 11 determines that the driver needs a rest. When the dialogue processing unit 13 receives a response to take a rest from the driver, the control unit 12 starts moving of the vehicle to a parking area. As a result, the driver can be informed in advance that the vehicle is moved to the parking area for a rest.

Second Embodiment

Figure 7:
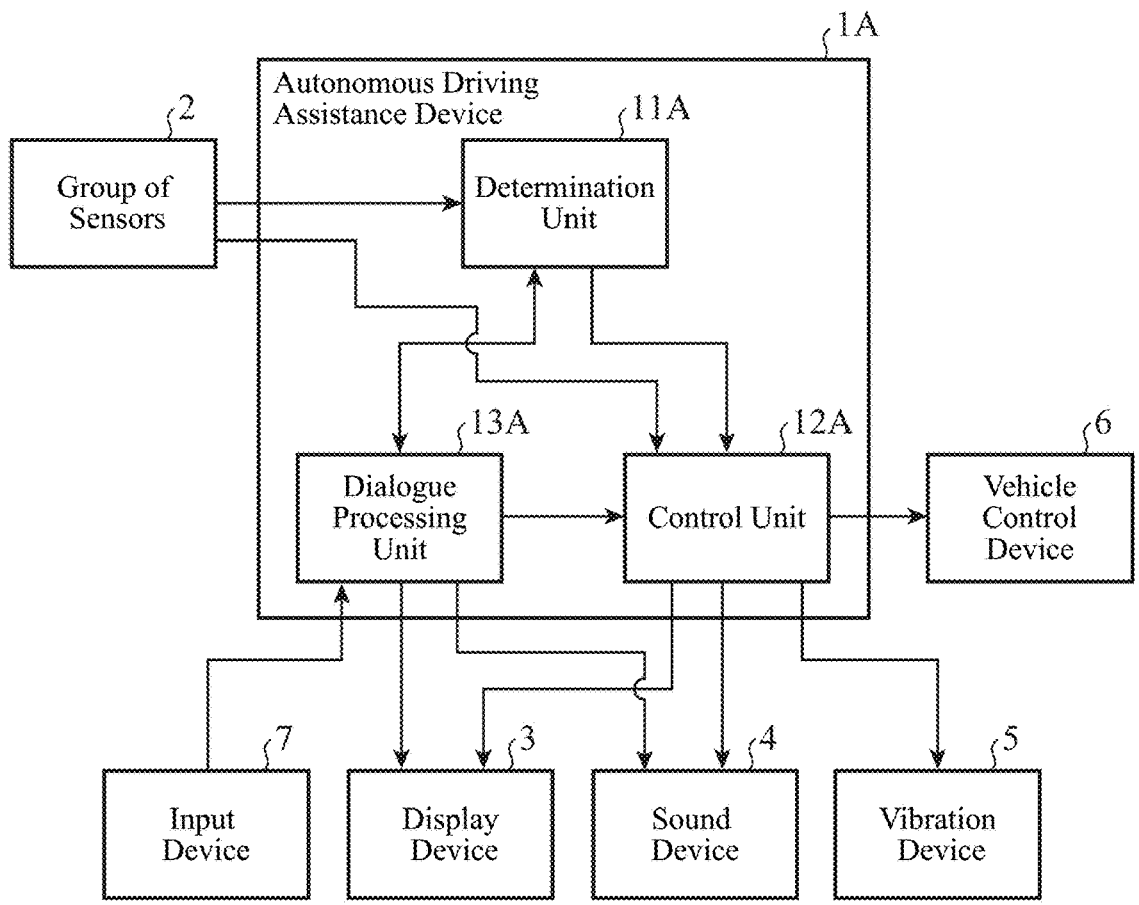
FIG. 7 is a block diagram illustrating a configuration of an autonomous driving assistance device according to a second embodiment.

FIG. 7 is a block diagram illustrating a configuration of an autonomous driving assistance device 1A according to a second embodiment. In FIG. 7, the same component as that in FIG. 1 is denoted with the same symbol and descriptions thereof are omitted. The autonomous driving assistance device 1A is provided, for example, in a vehicle having an autonomous driving function, and assists autonomous driving of the vehicle. The vehicle includes the autonomous driving assistance device 1A, a group of sensors 2, a display device 3, a sound device 4, a vibration device 5, a vehicle control device 6, and an input device 7. The display device 3, the sound device 4, and the vibration device 5 are output devices included in the vehicle.

Moreover, in a case where it is determined that the driver needs a rest, but a response of not taking a rest is received from the driver, the autonomous driving assistance device 1A causes an output device to output a pattern that prompts the driver to stay awake through at least one of sight, hearing, or touch.

The autonomous driving assistance device 1A includes a determination unit 11A, a control unit 12A, and a dialogue processing unit 13A. The determination unit 11A determines whether or not a driver needs a rest on the basis of detection information of the state of the driver of the vehicle. For example, like in the first embodiment, the determination unit 11A performs image analysis on image information of the driver captured by an in-vehicle camera and calculates the rest necessity level of the driver on the basis of the image analysis result. The determination unit 11A also determines that the driver needs a rest when the rest necessity level is higher than or equal to a threshold value and determines that the driver does not need a rest when the rest necessity level is less than the threshold value.

When the determination unit 11A determines that the driver needs a rest and the dialogue processing unit 13A receives a response "I take a rest" from the driver, the control unit 12A causes an output device of the vehicle to output a pattern that prompts the driver to sleep while the vehicle is parked in a parking area after starting to move to the parking area. The pattern that prompts the driver to sleep is, for example, a pattern of at least one of light, sound, or vibration as in the first embodiment.

Furthermore, in a case where the determination unit 11A determines that the driver needs a rest, but the dialogue processing unit 13A receives a response "I don't take a rest" from the driver, the control unit 12A causes an output device of the vehicle to output a pattern that prompts the driver to stay awake. The pattern that prompts the driver to stay awake is, for example, a pattern of at least one of light, sound, or vibration.

When the determination unit 11A determines that the driver needs a rest, the dialogue processing unit 13A inquires of the driver whether or not to take a rest in a similar procedure to that of the first embodiment. In a case where there has been a response "I take a rest" from the driver to the inquiry information, the dialogue processing unit 13A notifies the control unit 12A of the response information, and in a case where the driver responds "I don't take a rest", the dialogue processing unit 13A notifies the determination unit 11A and the control unit 12A of the response information.

Next, the operation of the autonomous driving assistance device 1A will be described.

Figure 8:
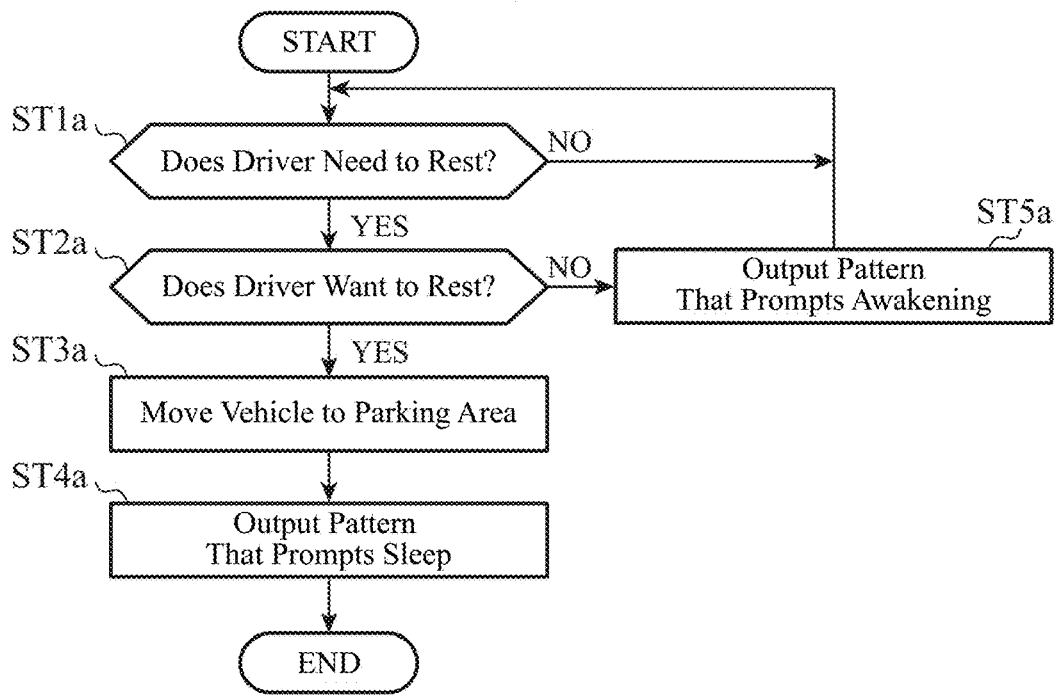
FIG. 8 is a flowchart illustrating an autonomous driving assistance method according to the second embodiment.

FIG. 8 is a flowchart illustrating an autonomous driving assistance method according to the second embodiment and illustrating the operation of the autonomous driving assistance device 1A illustrated in FIG. 7. Note that steps ST1a to ST4a in FIG. 8 are the same processes as those of steps ST1 to ST4 in FIG. 4, and thus description thereof is omitted.

If the dialogue processing unit 13A receives a response "I don't take a rest" from the driver (step ST2a; NO), the dialogue processing unit 13A notifies the determination unit 11A and the control unit 12A of the response information. If the driver does not take a rest, the determination unit 11A returns to step ST1a and repeats the determination as to whether or not the driver needs a rest.

On the other hand, if the driver does not take a rest, the control unit 12A causes at least one of the display device 3, the sound device 4, or the vibration device 5 to output a pattern that prompts the driver to stay awake (step ST5a). For example, the control unit 12A causes at least one of the display device 3, the sound device 4, or the vibration device 5 to output a pattern that prompts the driver to stay awake on the basis of information indicating the situation inside and outside the vehicle detected by the group of sensors 2.

The pattern that prompts the driver to stay awake is, for example, a pattern in which at least one of a light element, a sound element, or a vibration element is output at timing shifted from timing at which the vehicle sequentially passes in front of three-dimensional objects that are cyclically located on the roadside of the traveling road. With this pattern, a stimulus is given to at least one of sight, hearing, or touch of the driver at timing shifted from the cycle in which three-dimensional objects are located on the roadside. That is, since a visual stimulus is given to the driver in a cycle in which a three-dimensional object exists on the roadside, and a stimulus is further given at a timing different from this cycle, the driver is prompted to stay awake.

For example, the control unit 12A performs image analysis on image information of images ahead of the vehicle captured by the external camera and determines three-dimensional objects cyclically located on the roadside on the basis of the image analysis result. Then, the control unit 12A determines timing at which the vehicle sequentially passes by cyclic three-dimensional objects on the basis of the speed of the vehicle detected by the vehicle speed sensor and causes an output device to output a pattern of at least one of light, sound, or vibration so as to be shifted from the timing.

In addition, the control unit 12A detects vibration generated in the vehicle itself on the basis of the acceleration of the vehicle detected by an acceleration sensor included in the group of sensors 2. The control unit 12A controls the vibration device 5 on the basis of the vibration generated in the vehicle itself, thereby correcting a shift between the vibration pattern output from the vibration device 5 and the vibration transmitted to the driver in the cabin. As a result, in a case where the driver does not take a rest, a vibration pattern shifted from the timing at which the vehicle sequentially passes in front of three-dimensional objects cyclically located on the roadside is transmitted to the driver, thereby promoting the driver to stay awake.

The control unit 12A determines the brightness inside the cabin of the vehicle on the basis of the illuminance information around the vehicle detected by the illuminance sensor and controls the output of light by the display device 3 and thereby outputs a light pattern that prompts the driver to stay awake with luminance corresponding to the brightness inside the cabin. For example, the luminance of the light pattern is increased so as to be brighter than the brightness in the cabin. As a result, the shift between the light pattern output from the display device 3 and the brightness around the vehicle is emphasized, and the driver is prompted to stay awake.

The control unit 12A controls the output device so that, even when the timing at which the vehicle sequentially passes in front of three-dimensional objects that are cyclically located on the roadside is shifted as the vehicle turns right or left, the light pattern that prompts the driver to stay awake is not synchronized at this timing. For example, on the basis of at least one of the steering angle of the vehicle detected by the steering angle sensor or the angular velocity of the vehicle detected by the angular velocity sensor, the control unit 12A determines a timing shift corresponding to a right or left turn of the vehicle in the timing at which the vehicle sequentially passes in front of three-dimensional objects cyclically located on the roadside, controls the output device not to be synchronized with the timing in which the shift is taken into consideration, and outputs a pattern that prompts the driver to stay awake.

The pattern that prompts the driver to stay awake may be, for example, a pattern shifted from timing at which the vehicle sequentially passes in front of a building having a preset appearance among a plurality of buildings located on the roadside. For example, the control unit 12A distinguishes the appearance of a plurality of buildings located on the roadside on the basis of route information acquired from the navigation system and position information of the vehicle acquired from the GPS device. The control unit 12A causes the output device to output a pattern synchronized with the timing at which the vehicle sequentially passes in front of a building having the appearance matching a preset appearance among a plurality of buildings whose appearances have been distinguished as a pattern that prompts the driver to sleep and to output a pattern not synchronized with this timing as a pattern that prompts the driver to stay awake.

Furthermore, by controlling the sound device 4, the control unit 12A can cause a sound pattern matching the scenery outside the vehicle to be output as a pattern that prompts the driver to sleep and can cause a sound pattern not matching the scenery outside the vehicle to be output as a pattern that prompts the driver to stay awake. For example, when the vehicle is traveling in a city, the control unit 12A outputs a sound pattern using the sound of waves, and the hearing of the driver is stimulated by the sound not matching the scenery outside the vehicle, thereby promoted to stay awake.

The control unit 12A can change the pattern that prompts the driver to stay awake in accordance with the situation ahead of the vehicle acquired by wireless communication from the preceding vehicle traveling ahead of the vehicle. For example, in a case where there is an intersection ahead of the vehicle and the vehicle turns left at the intersection, the control unit 12A estimates the deceleration of the vehicle before arrival at the intersection and changes the output pattern so as to be shifted from the change in the vehicle speed that has been estimated. As a result, the driver is stimulated at timing shifted from the real-time change in the situation outside the vehicle and is thereby promoted to stay awake.

The control unit 12A can perform image analysis on image information of the driver captured by the in-vehicle camera, determine the face orientation, the posture, or the physique of the driver on the basis of the image analysis result, and control the display device 3, the sound device 4, or the vibration device 5 depending on the face orientation, the posture, or the physique of the driver. For example, the control unit 12A determines a display that is within the field of view of the driver from among the CID 3a, the ICD 3b, the dashboard display 3c, the pillar display 3d, the ceiling display 3e, and the door display 3f on the basis of the face orientation of the driver and displays a light pattern on the display that has been determined. In addition, the control unit 12A determines a location of the seat with which the body of the driver is in contact or a location of the seat on which the body weight is applied on the basis of the posture or the physique of the driver and causes a vibration speaker at the determined location of the seat among the vibration speakers 5a to 5c to output a vibration pattern. As a result, it is possible to appropriately output a pattern that prompts the driver to stay awake from the output device.

In addition, the control unit 12A can control the intensity of vibration output from the vibration device 5 on the basis of at least one of the steering angle of the vehicle detected by the steering angle sensor or the angular velocity of the vehicle detected by the angular velocity sensor. For example, even when the driver is seated facing the front, how the weight of the driver is applied to the seat changes depending on the travel of the vehicle, and thus, how the vibration output from the vibration speaker is transmitted to the driver also changes. When the vehicle turns right, the driver's weight is applied on the right side of the seat, and thus the vibration is output from the vibration speaker provided on the right side of the seat. As a result, the vibration device 5 can appropriately output a vibration pattern that prompts the driver to stay awake.

Note that the functions of the determination unit 11A, the control unit 12A, and the dialogue processing unit 13A in the autonomous driving assistance device 1A are implemented by a processing circuit. That is, the autonomous driving assistance device 1A includes a processing circuit for executing the processes from step ST1a to step ST5a illustrated in FIG. 8. The processing circuit may be the processing circuit 102 which is dedicated hardware illustrated in FIG. 6A or may be the processor 103 that executes a program stored in the memory 104 illustrated in FIG. 6B.

As described above, in the autonomous driving assistance device 1A according to the second embodiment, when the dialogue processing unit 13A receives a response of not taking a rest from the driver, the control unit 12A causes an output device to output a pattern that prompts the driver to stay awake through at least one of sight, hearing, or touch. As a result, in a case where the driver does not take a rest, it is possible to awaken the driver.

Third Embodiment

The autonomous driving assistance devices according to the first and second embodiments causes an output device to output a pattern that prompts a driver to sleep when the vehicle starts moving to a parking area. However, if the driver falls asleep completely while the vehicle is moving to the parking area by the autonomous driving, autonomous driving is executed in a state where it cannot be switched to manual driving, which is not preferable.

Therefore, in a case where it is estimated that the driver completely falls asleep while the vehicle is moving to the parking area by autonomous driving, an autonomous driving assistance device according to a third embodiment parks the vehicle in an emergency parking area closer than the initial parking area. As a result, it is possible to prevent execution of autonomous driving in a state where it cannot be switched to manual driving.

Figure 9:
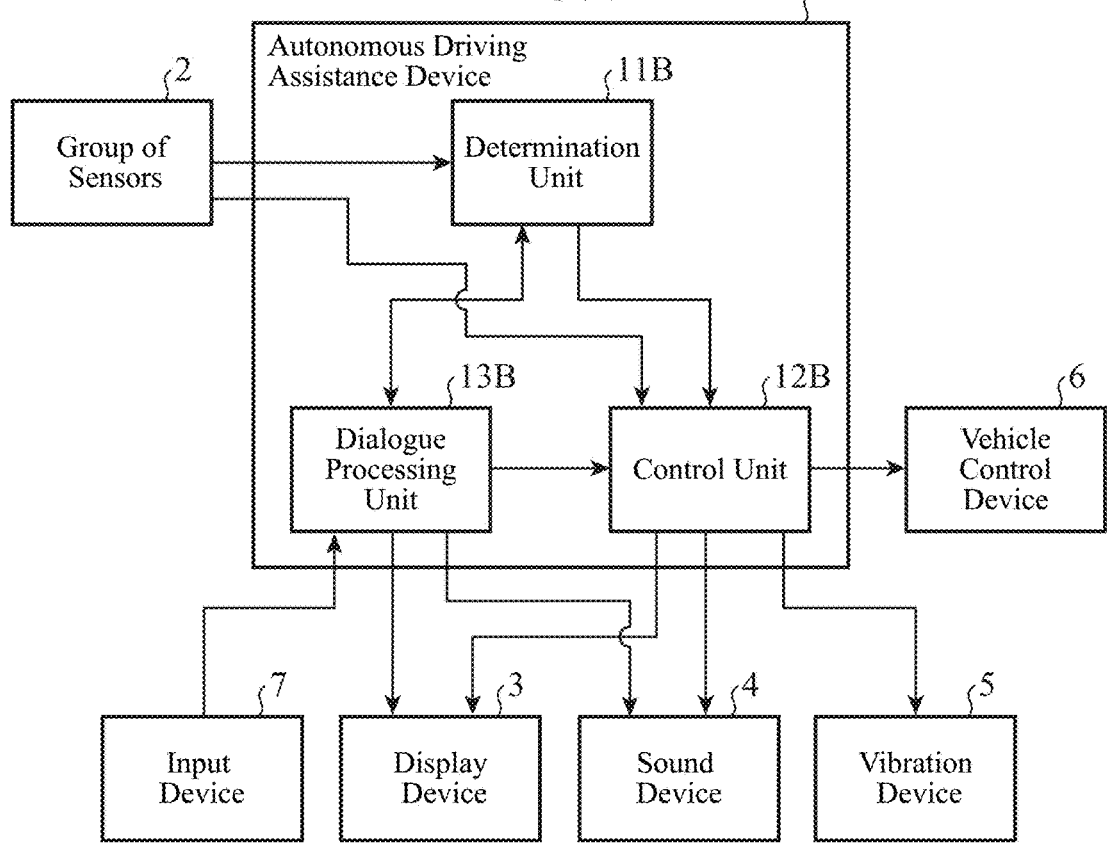
FIG. 9 is a block diagram illustrating a configuration of an autonomous driving assistance device according to a third embodiment.

FIG. 9 is a block diagram illustrating a configuration of an autonomous driving assistance device 1B according to the third embodiment. In FIG. 9, the same component as that in FIG. 1 is denoted with the same symbol, and description thereof is omitted. The autonomous driving assistance device 1B is provided, for example, in a vehicle having an autonomous driving function, and assists autonomous driving of the vehicle. The vehicle includes the autonomous driving assistance device 1B, a group of sensors 2, a display device 3, a sound device 4, a vibration device 5, a vehicle control device 6, and an input device 7. The display device 3, the sound device 4, and the vibration device 5 are output devices included in the vehicle.

Moreover, in a case where a time length in which the vehicle can reach a parking area is longer than a time length for which the vehicle is estimated to be able to travel before the driver of the vehicle falls asleep, the autonomous driving assistance device 1B parks the vehicle in an emergency parking area closer than the parking area.

The autonomous driving assistance device 1B includes a determination unit 11B, a control unit 12B, and a dialogue processing unit 13B. The determination unit 11B operates similarly to at least one of the determination unit 11 described in the first embodiment or the determination unit 11A described in the second embodiment, calculates a first period of time and a second period of time, and compares the first period of time and the second period of time. The first period of time is a time length for which the vehicle is estimated to be able to travel before the driver of the vehicle falls asleep, and the second period of time is a time length in which the vehicle can reach a parking area.

The control unit 12B operates similarly to at least one of the control unit 12 described in the first embodiment or the control unit 12A described in the second embodiment and parks the vehicle in an emergency parking area closer than the parking area when determination unit 11B determines that the second period of time is longer than the first period of time. For example, the control unit 12B instructs the vehicle control device 6 to move the vehicle to the emergency parking area by autonomous driving. The emergency parking area is an area that is closest to the vehicle where the vehicle can be parked and is, for example, a side strip.

When the determination unit 11B determines that the driver needs a rest, the dialogue processing unit 13B inquires of the driver whether or not to take a rest in a similar procedure to that of the first embodiment. In a case where there has been a response "I take a rest" from the driver to the inquiry information, the dialogue processing unit 13B notifies the control unit 12B of the response information, and in a case where the driver responds "I don't take a rest", the dialogue processing unit 13B notifies the determination unit 11B and the control unit 12B of the response information.

Next, the operation of the autonomous driving assistance device 1B will be described.

Figure 10:
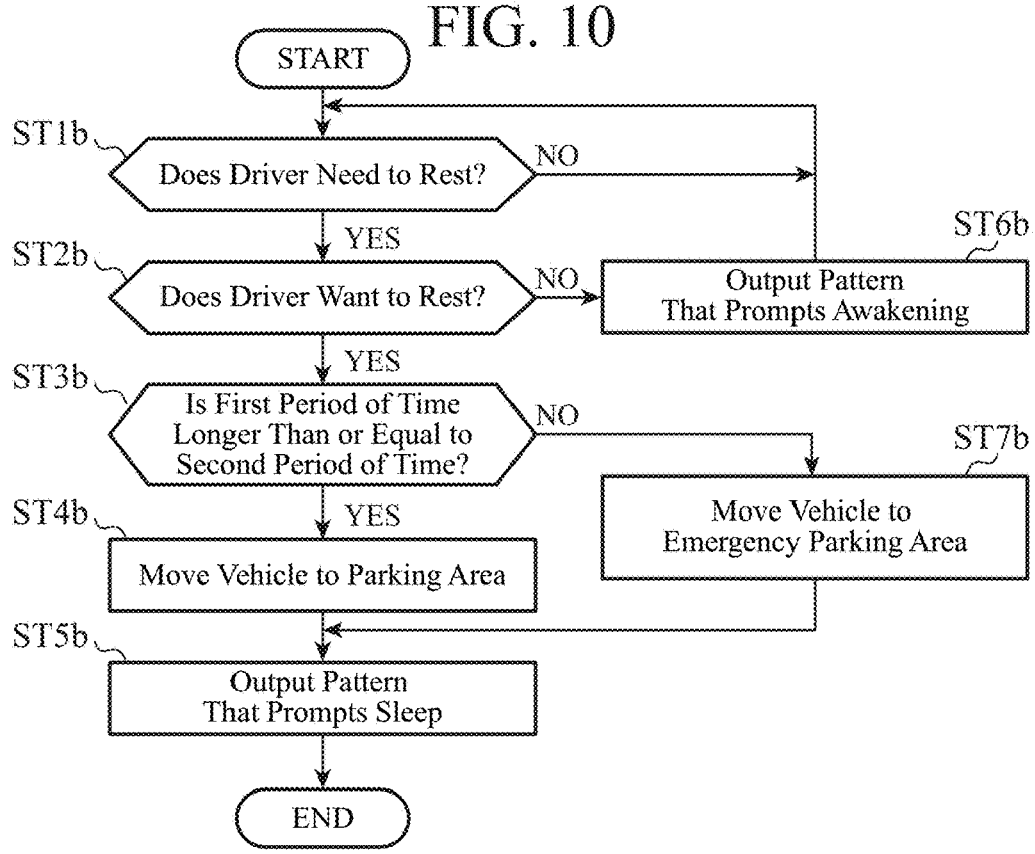
FIG. 10 is a flowchart illustrating an autonomous driving assistance method according to the third embodiment.

FIG. 10 is a flowchart illustrating an autonomous driving assistance method according to the third embodiment and illustrating the operation of the autonomous driving assistance device 1B illustrated in FIG. 9. Note that steps ST1b to ST2b and steps ST4b to ST5b are the same processes as those of steps ST1 to ST2 and steps ST3 to ST4 in FIG. 4, and thus description thereof is omitted. Furthermore, since step ST6b is the same process as that of step ST5a of FIG. 8, description thereof is omitted.

If a response "I take a rest" is received from the driver by the dialogue processing unit 13B (step ST2b; YES), the determination unit 11B determines whether or not the first period of time is longer than or equal to the second period of time (step ST3b). For example, after calculating the rest necessity level of the driver in a similar manner to the procedure described in the first embodiment, the determination unit 11B refers to table information in which the state of the driver based on the rest necessity level is associated with the time it takes for the driver in this state falls asleep and thereby estimates the first period of time that is the time it takes for the driver to fall asleep from the current time. Note that the table information is, for example, information including a result of statistical analysis of the state of the driver in which rest necessity levels of a certain level or higher continues for certain time or longer and the time it takes for the driver in that state falls asleep. The determination unit 11B calculates the second period of time that is the time it takes for the vehicle to reach the parking area from the current position on the basis of, for example, map information acquired by a navigation system and position information of the vehicle acquired by a GPS device. After calculating the first period of time and the second period of time, the determination unit 11B compares these periods of time.

If the first period of time is longer than or equal to the second period of time (step ST3b; YES), the determination unit 11B notifies this comparison result to the control unit 12B. If the first period of time is longer than or equal to the second period of time, the vehicle arrives at the parking area before the driver falls asleep, and thus the flow proceeds to step ST4b. As a result, the same processes as those of steps ST3 to ST4 in FIG. 4 are executed.

If the first period of time is less than the second period of time, that is, if the second period of time is longer than the first period of time (step ST3b; NO), the determination unit 11B notifies the control unit 12B of the comparison result. When receiving the comparison result that the second period of time is longer than the first period of time, the control unit 12B instructs the vehicle control device 6 to move the vehicle to an emergency parking area by autonomous driving (step ST7b). For example, the control unit 12B performs image analysis on image information of images ahead of the vehicle captured by an external camera, determines the width of a side strip ahead of the vehicle and the presence or absence of other vehicles on the basis of the image analysis result, and determines an emergency parking area. Alternatively, the control unit 12 may perform wireless communication with a preceding vehicle traveling ahead to inquire whether or not there is an area where the vehicle can park for emergency and determine an area specified by the response from the preceding vehicle by the wireless communication as an emergency parking area. When arriving at the emergency parking area, the vehicle is autonomously parked by the vehicle control device 6.

The dialogue processing unit 13B may notify the driver that the vehicle moves to an emergency parking area by using any one or both of the display device 3 and the sound device 4. The driver can recognize that the parking spot has been changed from the initial parking area. Furthermore, the control unit 12B may monitor the state of the driver using the in-vehicle camera and may instruct the vehicle control device 6 to move the vehicle to the emergency parking area by autonomous driving when the driver falls asleep while the vehicle is traveling to the parking area.

Furthermore, the determination unit 11B may calculate the second period of time in consideration of a road situation such as a traffic jam on the basis of vehicle exterior information acquired by the navigation system or vehicle exterior information received from a preceding vehicle by wireless communication. As a result, it is possible to accurately calculate the time length in which the vehicle can reach a parking area.

Note that the functions of the determination unit 11B, the control unit 12B, and the dialogue processing unit 13B in the autonomous driving assistance device 1B are implemented by a processing circuit. That is, the autonomous driving assistance device 1B includes a processing circuit for executing the processes from step ST1b to step ST7b illustrated in FIG. 10. The processing circuit may be the processing circuit 102 which is dedicated hardware illustrated in FIG. 6A or may be the processor 103 that executes a program stored in the memory 104 illustrated in FIG. 6B.

As described above, in the autonomous driving assistance device 1B according to the third embodiment, the determination unit 11B compares the first period of time during which the vehicle is estimated to be able to travel before the driver of the vehicle falls asleep with the second period of time in which the vehicle can reach a parking area. In a case where the second period of time is longer than the first period of time, the control unit 12B parks the vehicle at an emergency parking area closer than the parking area. It is possible to prevent the driver from completely falling asleep before arriving at the parking area and to prevent execution of autonomous driving in a state where it cannot be switched to manual driving.

Fourth Embodiment

In a case where it is estimated that the driver falls asleep completely while the vehicle is moving to a parking area by autonomous driving, an autonomous driving assistance device according to a fourth embodiment controls traveling of the vehicle by autonomous driving so that the vehicle arrives at the parking area before the driver falls asleep. As a result, it is possible to prevent execution of autonomous driving in a state where it cannot be switched to manual driving.

Figure 11:
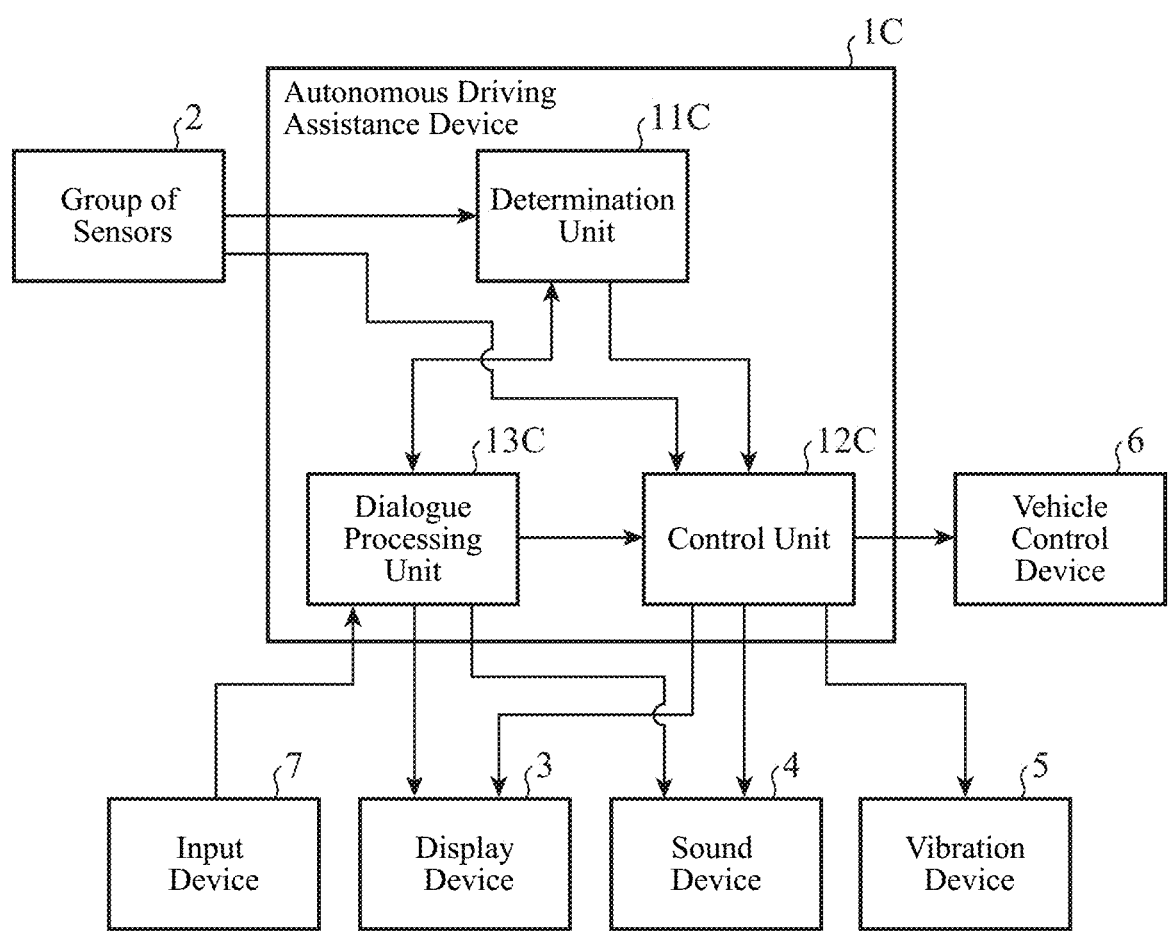
FIG. 11 is a block diagram illustrating a configuration of an autonomous driving assistance device according to a fourth embodiment.

FIG. 11 is a block diagram illustrating a configuration of an autonomous driving assistance device 1C according to the fourth embodiment. In FIG. 11, the same component as that in FIG. 1 is denoted with the same symbol and descriptions thereof are omitted. The autonomous driving assistance device 1C is provided, for example, in a vehicle having an autonomous driving function, and assists autonomous driving of the vehicle. The vehicle includes the autonomous driving assistance device 1C, a group of sensors 2, a display device 3, a sound device 4, a vibration device 5, a vehicle control device 6, and an input device 7. The display device 3, the sound device 4, and the vibration device 5 are output devices included in the vehicle.

In a case where a time length in which the vehicle can reach a parking area is longer than a time length for which the vehicle is estimated to be able to travel before the driver of the vehicle falls asleep, the autonomous driving assistance device 1C controls the speed of the vehicle and moves the vehicle to the parking area so that the time length in which the vehicle can reach the parking area becomes longer than the time length for which the vehicle is estimated to be able to travel before the driver of the vehicle falls asleep.

The autonomous driving assistance device 1C includes a determination unit 11C, a control unit 12C, and a dialogue processing unit 13C. The determination unit 11C operates similarly to at least one of the determination unit 11 described in the first embodiment or the determination unit 11A described in the second embodiment, calculates a first period of time and a second period of time and compares the first period of time and the second period of time like in the third embodiment. The first period of time is a time length for which the vehicle is estimated to be able to travel before the driver of the vehicle falls asleep, and the second period of time is a time length in which the vehicle can reach a parking area. In addition, in a case where the second period of time is longer than the first period of time, the determination unit 11C determines whether or not it is possible to perform control to increase the speed of the vehicle so that the first period of time becomes longer than or equal to the second period of time.

The control unit 12C operates similarly to at least one of the control unit 12 described in the first embodiment or the control unit 12A described in the second embodiment. Furthermore, in a case where the determination unit 11C determines that the second period of time is longer than the first period of time and determines that it is possible to perform control for increasing the speed of the vehicle so that the first period of time becomes longer than or equal to the second period of time, the control unit 12C controls the speed of the vehicle so that the first period of time becomes longer than or equal to the second period of time and moves the vehicle to the parking area.

When the determination unit 11C determines that the driver needs a rest, the dialogue processing unit 13C inquires of the driver whether or not to take a rest in a similar procedure to that of the first embodiment. In a case where there has been a response "I take a rest" from the driver to the inquiry information, the dialogue processing unit 13C notifies the control unit 12C of the response information, and in a case where the driver responds "I don't take a rest", the dialogue processing unit 13C notifies the determination unit 11C and the control unit 12C of the response information.

Next, the operation of the autonomous driving assistance device 1C will be described.

Figure 12:
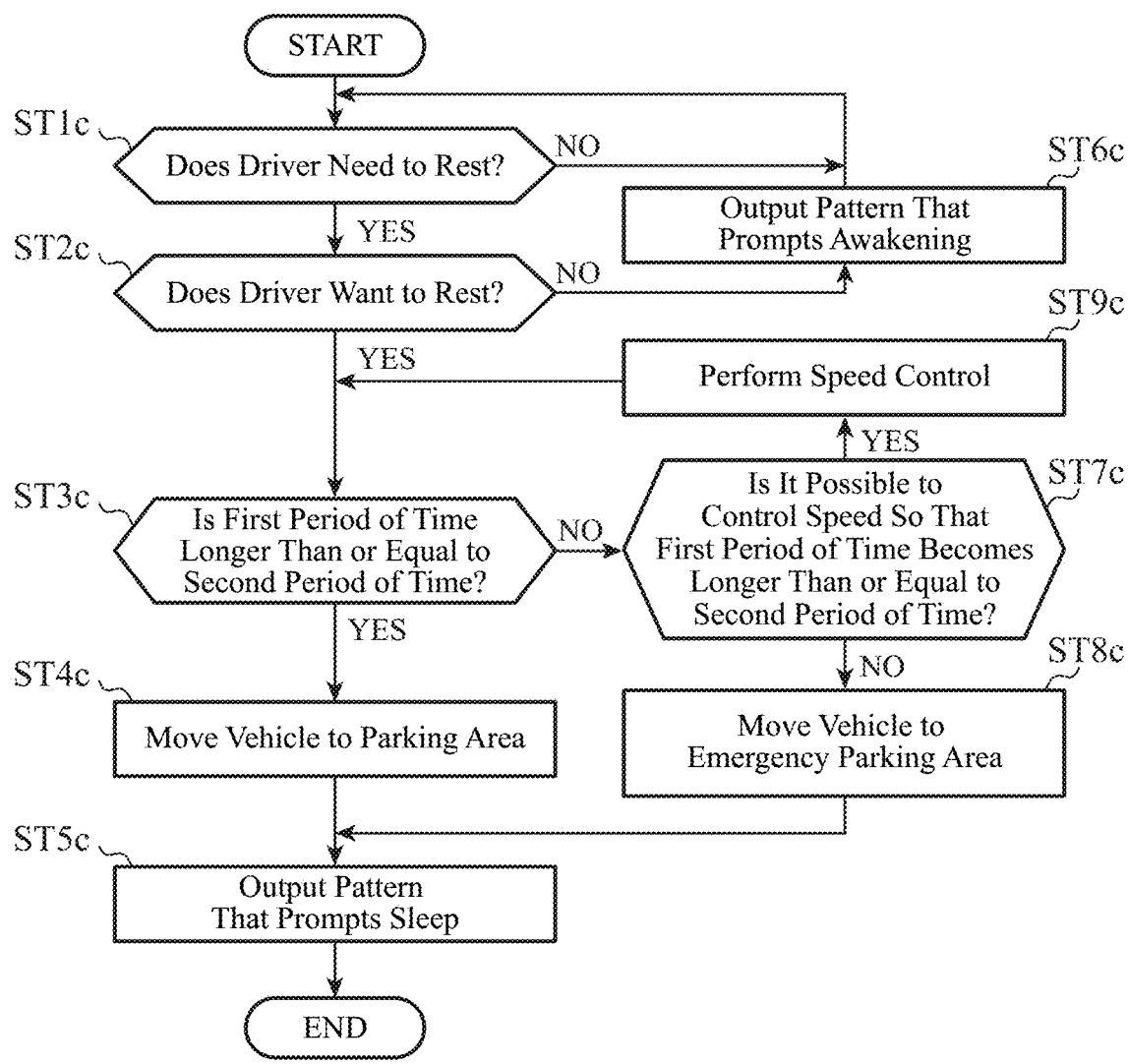
FIG. 12 is a flowchart illustrating an autonomous driving assistance method according to the fourth embodiment.

FIG. 12 is a flowchart illustrating an autonomous driving assistance method according to the fourth embodiment and illustrating the operation of the autonomous driving assistance device 1C illustrated in FIG. 11. Note that processes of steps ST1c to ST2c and steps ST4c to ST5c are the same as those of steps ST1 to ST2 and steps ST3 to ST4 in FIG. 4, and thus description thereof is omitted. Furthermore, since step ST6c is the same process as that of step ST5a of FIG. 8, description thereof is omitted.

If the first period of time is less than the second period of time, that is, if the second period of time is longer than the first period of time (step ST3c; NO), the determination unit 11C determines whether or not it is possible to perform control to increase the speed of the vehicle so that the first period of time becomes longer than or equal to the second period of time (step ST7c). For example, the determination unit 11C calculates the difference between the speed limit of the road on which the vehicle is traveling and the current speed of the vehicle on the basis of road information acquired from the navigation system, the position information of the vehicle acquired from the GPS device, and the speed of the vehicle detected by the vehicle speed sensor. The determination unit 11C determines whether or not the speed of the vehicle can be further increased on the basis of the difference between the speed limit of the road and the current speed of the vehicle and, in a case where the speed of the vehicle can be further increased, calculates the second period of time in a case where the speed of the vehicle is increased. The determination unit 11C compares the second period of time calculated in this manner with the first period of time again and determines whether or not it is possible to perform control to increase the speed of the vehicle so that the first period of time becomes longer than or equal to the second period of time.

If the determination unit 11C determines that it is not possible to perform control to increase the speed of the vehicle so that the first period of time becomes longer than or equal to the second period of time (step ST7c; NO), this determination result is notified to the control unit 12C. After receiving this determination result, the control unit 12C instructs the vehicle control device 6 to move the vehicle to the emergency parking area by autonomous driving in a procedure similar to that of the third embodiment (step ST8c). When arriving at the emergency parking area, the vehicle is autonomously parked by the vehicle control device 6.

On the contrary, if the determination unit 11C determines that it is possible to perform control to increase the speed of the vehicle so that the first period of time becomes longer than or equal to the second period of time (step ST7c; YES), this determination result is notified to the control unit 12C. After receiving this determination result, the control unit 12C instructs the vehicle control device 6 to perform control to increase the speed of the vehicle so that the first period of time becomes longer than or equal to the second period of time and thereby moves the vehicle to the parking area (step ST9c). Thereafter, the flow returns to the determination process of step ST3c.

The dialogue processing unit 13C may notify the driver that the vehicle moves to the parking area or an emergency parking area by using any one or both of the display device 3 and the sound device 4. The driver can recognize that the vehicle is moving to an area where the vehicle can be parked. Furthermore, the control unit 12C may monitor the state of the driver using the in-vehicle camera and may instruct the vehicle control device 6 to move the vehicle to the emergency parking area by autonomous driving when the driver falls asleep while the vehicle is traveling to the parking area.

The determination unit 11C may calculate the second period of time in consideration of a road situation such as a traffic jam on the basis of vehicle exterior information acquired by the navigation system or vehicle exterior information received from a preceding vehicle by wireless communication. As a result, it is possible to accurately calculate the time length in which the vehicle can reach a parking area.

Note that the functions of the determination unit 11C, the control unit 12C, and the dialogue processing unit 13C in the autonomous driving assistance device 1C are implemented by a processing circuit. That is, the autonomous driving assistance device 1C includes a processing circuit for executing the processes from step ST1c to step ST9c illustrated in FIG. 12. The processing circuit may be the processing circuit 102 which is dedicated hardware illustrated in FIG. 6A or may be the processor 103 that executes a program stored in the memory 104 illustrated in FIG. 6B.

As described above, in the autonomous driving assistance device 1C according to the fourth embodiment, the determination unit 11C compares the first period of time during which the vehicle is estimated to be able to travel before the driver of the vehicle falls asleep with the second period of time in which the vehicle can reach a parking area. In a case where the second period of time is longer than the first period of time, the control unit 12C controls the speed of the vehicle so that the first period of time becomes longer than or equal to the second period of time and moves the vehicle to the parking area. As a result, the autonomous driving assistance device 1C can prevent execution of autonomous driving in a state where it cannot be switched to manual driving.

Fifth Embodiment

Figure 13:
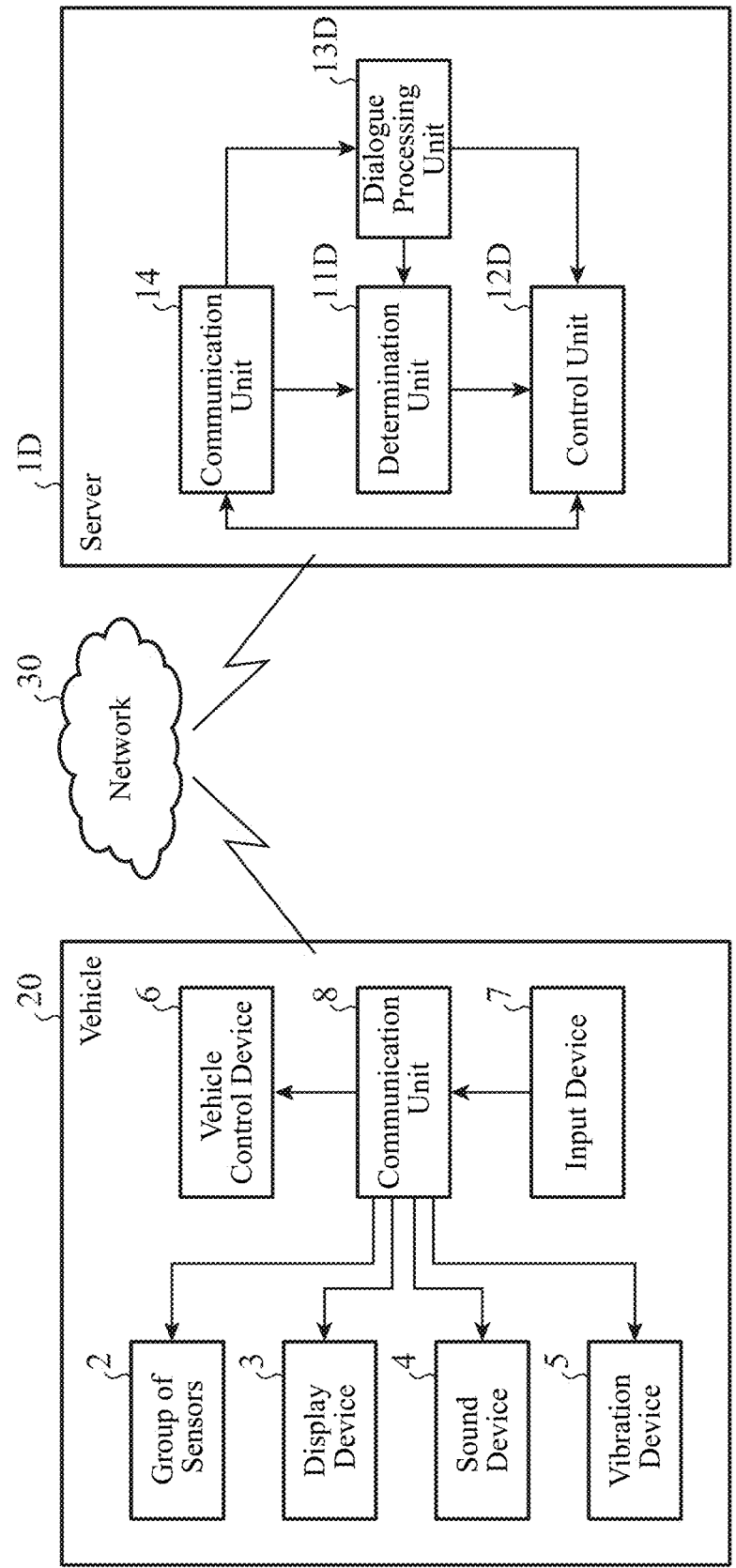
FIG. 13 is a block diagram illustrating a configuration of an autonomous driving assistance system according to a fifth embodiment.

FIG. 13 is a block diagram illustrating a configuration of an autonomous driving assistance system according to a fifth embodiment. In FIG. 13, the same component as that in FIG. 1 is denoted by the same symbol and description thereof is omitted. In an autonomous-manual-switching assistance system illustrated in FIG. 13, a server 1D and a vehicle 20 can communicate with each other via a network 30. The server 1D is an autonomous driving assistance device that assists autonomous driving of the vehicle 20 by controlling the vehicle 20 by wireless communication via the network 30.

As illustrated in FIG. 13, the server 1D includes a determination unit 11D, a control unit 12D, a dialogue processing unit 13D, and a communication unit 14. The vehicle 20 includes a group of sensors 2, a display device 3, a sound device 4, a vibration device 5, a vehicle control device 6, an input device 7, and a communication unit 8. The group of sensors 2 includes the various sensors described in the first embodiment and detects the state inside and outside the vehicle 20. The display device 3, the sound device 4, and the vibration device 5 are output devices included in the vehicle 20, and a pattern that prompts the driver to sleep is output from at least one of these devices.

The communication unit 8 is included in the vehicle 20 and communicates with the communication unit 14 via the network 30. Likewise, the communication unit 14 is communication unit included in the server 1D and communicates with the communication unit 8 via the network 30. For example, the communication unit 8 and the communication unit 14 perform wireless communication of transmitting information via an antenna and receiving information via the antenna.

The determination unit 11D determines whether or not a driver needs a rest on the basis of detection information of the state of the driver of the vehicle. For example, the communication unit 14 receives, from the vehicle 20, image information of the driver of the vehicle 20 captured by the in-vehicle camera of the group of sensors 2. The determination unit 11D performs image analysis on the image information received by the communication unit 14 and calculates the rest necessity level of the driver on the basis of the image analysis result. After calculating the rest necessity level of the driver, the determination unit 11D determines that the driver needs a rest when a period in which the rest necessity level is higher than or equal to a threshold value lasts longer than or equal to a certain period of time.

In addition, the determination unit 11D calculates a first period of time for which the vehicle 20 is estimated to be able to travel before the driver of the vehicle 20 falls asleep and a second period of time in which the vehicle 20 can reach the parking area and compares the first period of time and the second period of time. For example, the determination unit 11D refers to table information in which the state of the driver based on the rest necessity level of the driver is associated with the time it takes for the driver in this state to fall asleep and thereby estimates the first period of time that is the time it takes for the driver to fall asleep from the current time. The determination unit 11D calculates the second period of time, which is the time it takes for the vehicle to reach the parking area from the current position, on the basis of map information and the position information of the vehicle received from the vehicle 20 by the communication unit 14.

In addition, in a case where the second period of time is longer than the first period of time, the determination unit 11D determines whether or not it is possible to perform control to increase the speed of the vehicle so that the first period of time becomes longer than or equal to the second period of time. For example, the determination unit 11D calculates the difference between the speed limit of the road on which the vehicle 20 is traveling and the current speed of the vehicle 20 on the basis of the road information, the position information of the vehicle 20, and the speed of the vehicle 20 received from the vehicle 20 by the communication unit 14. The determination unit 11D determines whether or not the speed of the vehicle 20 can be further increased on the basis of the difference between the speed limit of the road and the current speed of the vehicle 20 and, in a case where the speed of the vehicle 20 can be further increased, calculates the second period of time in a case where the speed of the vehicle 20 is increased. The determination unit 11D compares the second period of time calculated in this manner with the first period of time again and determines whether or not it is possible to perform control to increase the speed of the vehicle 20 so that the first period of time becomes longer than or equal to the second period of time.

The control unit 12D causes an output device of the vehicle 20 to output a pattern that prompts a driver to sleep during a period in which the vehicle 20 has started moving to a parking area and is parked at the parking area in a case where the determination unit 11D has determined that the driver needs a rest. Furthermore, in a case where the determination unit 11D determines that the driver needs a rest, but the dialogue processing unit 13D receives a response "I don't take a rest" from the driver, the control unit 12D causes an output device of the vehicle 20 to output a pattern that prompts the driver to stay awake. The control unit 12D transmits control information of autonomous driving of the vehicle 20 to the communication unit 8 via the network 30 using the communication unit 14. The vehicle control device 6 included in the vehicle 20 moves the vehicle 20 to the parking area by autonomous driving on the basis of the control information of autonomous driving received from the server 1D by the communication unit 8.

When the determination unit 11D determines that the second period of time is longer than the first period of time, the control unit 12D parks the vehicle 20 at an emergency parking area closer than the parking area or controls the speed of the vehicle 20 to move the vehicle to the parking area. For example, the control unit 12D transmits control information of autonomous driving of the vehicle 20 to the communication unit 8 using the communication unit 14. The vehicle control device 6 included in the vehicle 20 moves the vehicle 20 to the emergency parking area by autonomous driving or controls the speed of the vehicle 20 to move the vehicle to the parking area on the basis of the control information of autonomous driving received from the server 1D by the communication unit 8.

When the determination unit 11D determines that a driver of the vehicle 20 needs a rest, the dialogue processing unit 13D inquires of the driver of the vehicle 20 whether or not to take a rest. For example, the dialogue processing unit 13D transmits inquiry information to the communication unit 8 using the communication unit 14. The inquiry information received from the server 1D by the communication unit 8 is displayed on the display device 3 or output by voice from the sound device 4. When receiving response information from the driver to the inquiry, the input device 7 outputs the response information to the communication unit 8. The communication unit 8 transmits the response information to the communication unit 14. In a case where the response information received from the vehicle 20 by the communication unit 14 is a response of "I take a rest", the control unit 12D transmits, to the vehicle 20 by the communication unit 14, control information for outputting a pattern that prompts the driver to sleep. By the control information received from the server 1D by the communication unit 8, a pattern that prompts the driver to sleep is output from at least one of the display device 3, the sound device 4, or the vibration device 5.

Although the server 1D functioning as the autonomous driving assistance device has been described so far, a device that is caused to function as the autonomous driving assistance device is not limited to the server 1D as long as the device can communicate with the communication unit 8 of the vehicle 20. For example, a portable terminal brought into the vehicle 20 such as a tablet device or a smartphone may be caused to function as the autonomous driving assistance device.

Note that, in a case of not inquiring the driver whether or not to take a rest, when the determination unit 11D determines that the driver needs a rest, the control unit 12D immediately outputs a pattern that prompts the driver to sleep from an output device. In this case, the server 1D may not include the dialogue processing unit 13D.

As described above, the autonomous driving assistance system according to the fifth embodiment includes: the group of sensors 2 for detecting a state inside and outside the vehicle 20; the output devices 3 to 5 included in the vehicle 20; the determination unit 11D for determining whether or not a driver of the vehicle 20 needs a rest on the basis of a state of the driver detected by the group of sensors 2; and the control unit 12D for causing the output devices 3 to 5 to output a pattern that prompts the driver to sleep through at least one of sight, hearing, or touch during a period in which the vehicle 20 has started moving to a parking area and is parked at the parking area in a case where the determination unit 11D has determined that the driver needs a rest. As a result, it possible to assist manual driving switched to, from autonomous driving.

Note that the present invention is not limited to the above embodiments, and the present invention may include a flexible combination of the individual embodiments, a modification of any component of the individual embodiments, or omission of any component in the individual embodiments within the scope of the present invention.

INDUSTRIAL APPLICABILITY

An autonomous driving assistance device according to the present invention provides an in-vehicle environment that prompts a driver to sleep to let a fatigued driver to take a rest. Therefore, the autonomous driving assistance device can be used for, for example, a vehicle whose driving authority is transferred between the vehicle and the driver.

REFERENCE SIGNS LIST 1, 1A to 1C: autonomous driving assistance device, 1D: server, 2: group of sensors, 3: display device, 3c: dashboard display, 3d: pillar display, 3e: ceiling display, 3f: door display, 4: sound device, 4a: tweeter speaker, 4b: woofer speaker, 5: vibration device, 5a to 5c: vibration speaker, 6: vehicle control device, 7: input device, 8: communication unit, 11, 11A to 11D: determination unit, 12, 12A to 12D: control unit, 13, 13A to 13D: dialogue processing unit, 14: communication unit, 20: vehicle, 30: network, 100: input interface, 101: output interface, 102: processing circuit, 103: processor, 104: memory

The invention claimed is:

1. An autonomous driving assistance device comprising: processing circuitry configured to
determine whether or not a driver of a vehicle needs a rest on a basis of detection information of a state of the driver;
cause an output device of the vehicle to output a pattern that prompts the driver to sleep via at least one of sight, hearing, or touch during a period in which the vehicle has started moving to a parking area and is parked at the parking area in a case where it has been determined that the driver needs a rest; and
inquire the driver whether or not to take a rest when it is determined that the driver needs a rest,
wherein the processing circuitry starts moving the vehicle to the parking area when a response of taking a rest from the driver is received, and
the processing circuitry causes the output device to output a pattern that prompts the driver to stay awake through at least one of sight, hearing, or touch when a response of not taking a rest from the driver is received.

2. The autonomous driving assistance device according to claim 1,
wherein the output device is at least one of a display device, a sound device, or a vibration device, and
the pattern that prompts the driver to sleep includes a pattern of at least one of light, sound, or vibration.

3. The autonomous driving assistance device according to claim 1,
wherein the processing circuitry compares a first period of time during which it is estimated that the vehicle will successfully travel before the driver of the vehicle falls asleep, with a second period of time during which the vehicle successfully reaches the parking area, and
the processing circuitry parks the vehicle in an emergency parking area closer than the parking area in a case where the second period of time is longer than the first period of time.

4. The autonomous driving assistance device according to claim 1,
wherein the processing circuitry compares a first period of time during which it is estimated that the vehicle will successfully travel before the driver of the vehicle falls asleep, with a second period of time during which the vehicle successfully reaches the parking area, and
the processing circuitry controls a speed of the vehicle so that the first period of time becomes longer than or equal to the second period of time and moves the vehicle to the parking area in a case where the second period of time is longer than or equal to the first period of time.

5. The autonomous driving assistance device according to claim 1, further comprising:
a plurality of sensors to generate the detection information.

6. An autonomous driving assistance system comprising:
a group of sensors for detecting a state inside and outside a vehicle;
an output device included in the vehicle; and
processing circuitry configured to
determine whether or not a driver of the vehicle needs a rest on a basis of a state of the driver detected by the group of sensors;
cause the output device to output a pattern that prompts the driver to sleep through at least one of sight, hearing, or touch during a period in which the vehicle has started moving to a parking area and is parked at the parking area in a case where it has been determined that the driver needs a rest; and
inquire the driver whether or not to take a rest when it is determined that the driver needs a rest,
wherein the processing circuitry starts moving the vehicle to the parking area when a response of taking a rest from the driver is received, and
the processing circuitry causes the output device to output a pattern that prompts the driver to stay awake through at least one of sight, hearing, or touch when a response of not taking a rest from the driver is received.

7. The autonomous driving assistance system according to claim 6, wherein:

the group of sensors generates detection information of the state of the driver.

8. The autonomous driving assistance system according to claim 6,
wherein the output device is at least one of a display device, a sound device, or a vibration device, and
the pattern that prompts the driver to sleep includes a pattern of at least one of light, sound, or vibration.

9. The autonomous driving assistance system according to claim 6,
wherein the processing circuitry compares a first period of time during which it is estimated that the vehicle will successfully travel before the driver of the vehicle falls asleep, with a second period of time during which the vehicle successfully reaches the parking area, and
the processing circuitry parks the vehicle in an emergency parking area closer than the parking area in a case where the second period of time is longer than the first period of time.

10. The autonomous driving assistance system according to claim 6,
wherein the processing circuitry compares a first period of time during which it is estimated that the vehicle will successfully travel before the driver of the vehicle falls asleep, with a second period of time during which the vehicle successfully reaches the parking area, and
the processing circuitry controls a speed of the vehicle so that the first period of time becomes longer than or equal to the second period of time and moves the vehicle to the parking area in a case where the second period of time is longer than or equal to the first period of time.

11. An autonomous driving assistance method comprising:
determining whether or not a driver of a vehicle needs a rest on a basis of detection information of a state of the driver; and
outputting a pattern that prompts the driver to sleep through at least one of sight, hearing, or touch during a period in which the vehicle has started moving to a parking area and is parked at the parking area in a case where it has been determined that the driver needs a rest;
inquiring the driver whether or not to take a rest when it is determined that the driver needs a rest,
starting to move the vehicle to the parking area when a response of taking a rest from the driver is received, and
outputting a pattern that prompts the driver to stay awake through at least one of sight, hearing, or touch when a response of not taking a rest from the driver is received.

12. The autonomous driving assistance method according to claim 11, further comprising:
generating the detection information using a plurality of sensors.

13. The autonomous driving assistance method according to claim 11,
wherein the outputting outputs at least one of a visual pattern, a sound pattern, or a vibration pattern.

14. The autonomous driving assistance method according to claim 11, further comprising:
comparing a first period of time during which it is estimated that the vehicle will successfully travel before the driver of the vehicle falls asleep, with a second period of time during which the vehicle successfully reaches the parking area,
wherein the starting to move the vehicle to the parking area parks the vehicle in an emergency parking area closer than the parking area in a case where the second period of time is longer than the first period of time.

15. The autonomous driving assistance method according to claim 11, further comprising:
comparing a first period of time during which it is estimated that the vehicle will successfully travel before the driver of the vehicle falls asleep, with a second period of time during which the vehicle successfully reaches the parking area; and
controlling a speed of the vehicle so that the first period of time becomes longer than or equal to the second period of time and moving the vehicle to the parking area in a case where the second period of time is longer than or equal to the first period of time.

* * * * *